US 6,721,057 B1

(12) United States Patent
Reininger

(10) Patent No.: US 6,721,057 B1
(45) Date of Patent: Apr. 13, 2004

(54) SPATIALLY MODULATED INTERFEROMETER AND BEAM SHEARING DEVICE THEREFOR

(75) Inventor: Francis M. Reininger, Irvine, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/547,790

(22) Filed: Apr. 12, 2000

Related U.S. Application Data
(60) Provisional application No. 60/129,383, filed on Mar. 13, 1999.

(51) Int. Cl.[7] .................................................. G01B 9/02
(52) U.S. Cl. ........................................ 356/520; 356/450
(58) Field of Search .................................. 356/450, 520

(56) References Cited

U.S. PATENT DOCUMENTS

| | | | | |
|---|---|---|---|---|
| 4,213,706 A | * | 7/1980 | Hill et al. ..................... | 356/520 |
| 4,395,123 A | * | 7/1983 | Minott ........................ | 356/510 |
| 4,509,857 A | | 4/1985 | Vermande .................... | 356/346 |
| 4,523,846 A | | 6/1985 | Breckinridge et al. ....... | 356/346 |
| 4,531,197 A | * | 7/1985 | Lin ............................. | 359/285 |
| 4,773,732 A | * | 9/1988 | Schafer ....................... | 359/578 |
| 4,976,542 A | | 12/1990 | Smith ......................... | 356/346 |
| 5,059,027 A | | 10/1991 | Roesler et al. .............. | 356/346 |
| 5,266,795 A | | 11/1993 | Vaughan | |
| 5,768,040 A | | 6/1998 | Macenka et al. ........... | 359/859 |
| 5,777,736 A | | 7/1998 | Horton ....................... | 356/346 |
| 5,781,293 A | | 7/1998 | Padgett et al. .............. | 356/346 |
| 5,880,834 A | | 3/1999 | Chrisp | |
| 5,999,311 A | * | 12/1999 | Nanba et al. ............... | 359/365 |

OTHER PUBLICATIONS

Hirst et al., "Optical sensors: a path to better gas detection", Global Challenges, Physics World, Aug. 1998, pp. 37–40.

Dohi et al., "Attainment of High Resolution Holographic Fourier Transform Spectroscopy", Applied Optics, May 1971, pp 1137–1140, vol. 10, No. 5.

Stroke et al., "Fourier–Transform Spectroscopy Using Holographic Imaging Without Computing and With Stationary Interferometers", Physics Letters, Jun. 1, 1965, pp. 272–274, vol. 16, No. 3.

Barnes, "Photodiode array Fourier transform spectrometer with improved dynamic range", Applied Optics, Nov. 15, 1985, pp. 3702–3706, vol. 24, No. 22.

Okamoto et al., "Fourier transform spectrometer with a self–scanning photodiode array", Applied Optics, Jan. 15, 1984, pp. 269–273, vol. 23, No. 2.

Flamini, Enrico et al.; *Remote mineralogy through multi-spectral imaging, the VIMS–V instrument*; 10 pp.

Lobb, D.R.; *Theory of concentric designs for grating spectrometers*; Applied Optics; May 1, 1994; vol. 33, No. 13, pp. 2648–2658.

(List continued on next page.)

Primary Examiner—T. Chowdhury
Assistant Examiner—George Wang
(74) Attorney, Agent, or Firm—Christie, Parker & Hale, LLP

(57) ABSTRACT

A spatially modulated interferometer incorporates a beam shearing system having a plurality of reflective surfaces defining separate light paths of equal optical path length for two separate output beams. The reflective surfaces are arranged such that when the two beams emerge from the beam shearing system they contain more than 50 percent of the photon flux within the selected spectral pass band. In one embodiment, the reflective surfaces are located on a number of prism elements combined to form a beam shearing prism structure. The interferometer utilizing the beam sharing system of the invention includes fore-optics for collecting light and focusing it into a beam to be sheared, and a detector located at an exit pupil of the device. In a preferred embodiment, the interferometer has no moving parts.

34 Claims, 19 Drawing Sheets

OTHER PUBLICATIONS

Mertz, L.; *Concentric spectographs*; Applied Optics; Dec. 1977; vol. 16, No. 12; pp. 3122–3124.

Offner, A.; *New Concepts in Projection Mask Aligners*; Optical Engineering; Mar.–Apr. 1975; vol. 14, No. 2; pp. 130–132.

Reininger, Francis; *Near ultraviolet visible infrared mapping spectrometer (NU–VIMS)*; SPIE; 1994; vol. 2209; pp. 332–344.

Reininger, Francis; *VIRTIS: Visible Infrared Thermal Imaging Spectrometer for the Rosetta mission*; SPIE; 1996; vol. 2819; pp. 66–77.

Reininger; Francis et al., *Visible infrared mapping spectrometer–visible channel (VIMS–V)*; SPIE; 1994; vol. 2198; pp. 239–250.

* cited by examiner

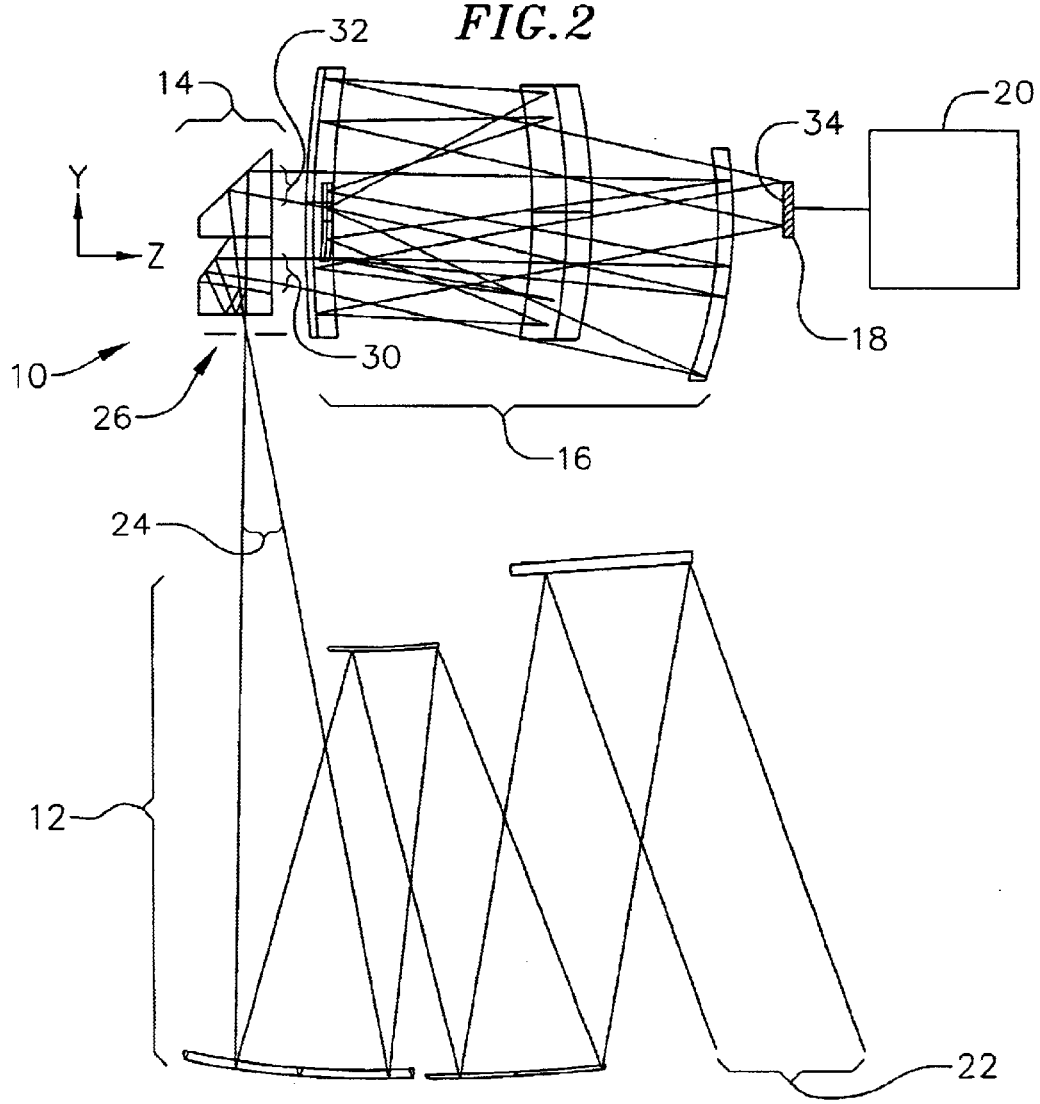
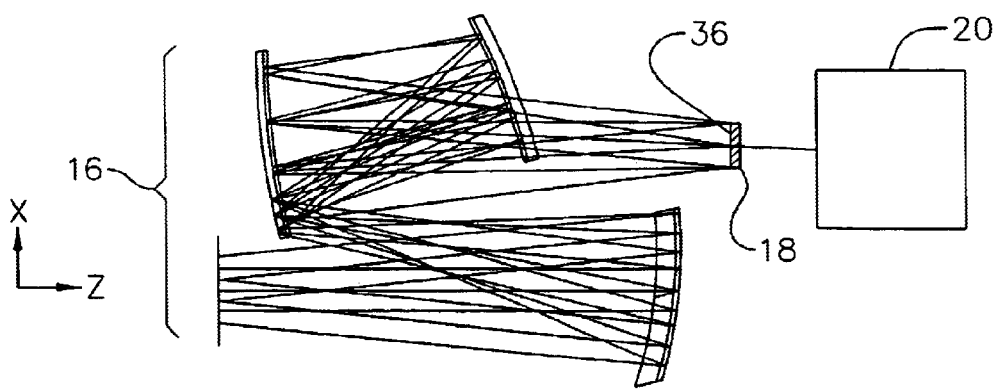

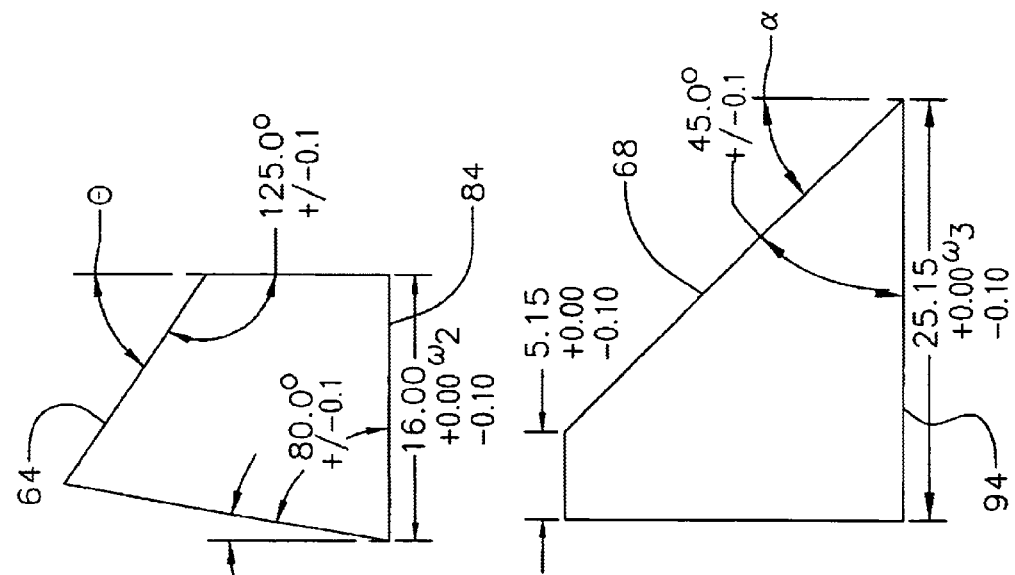
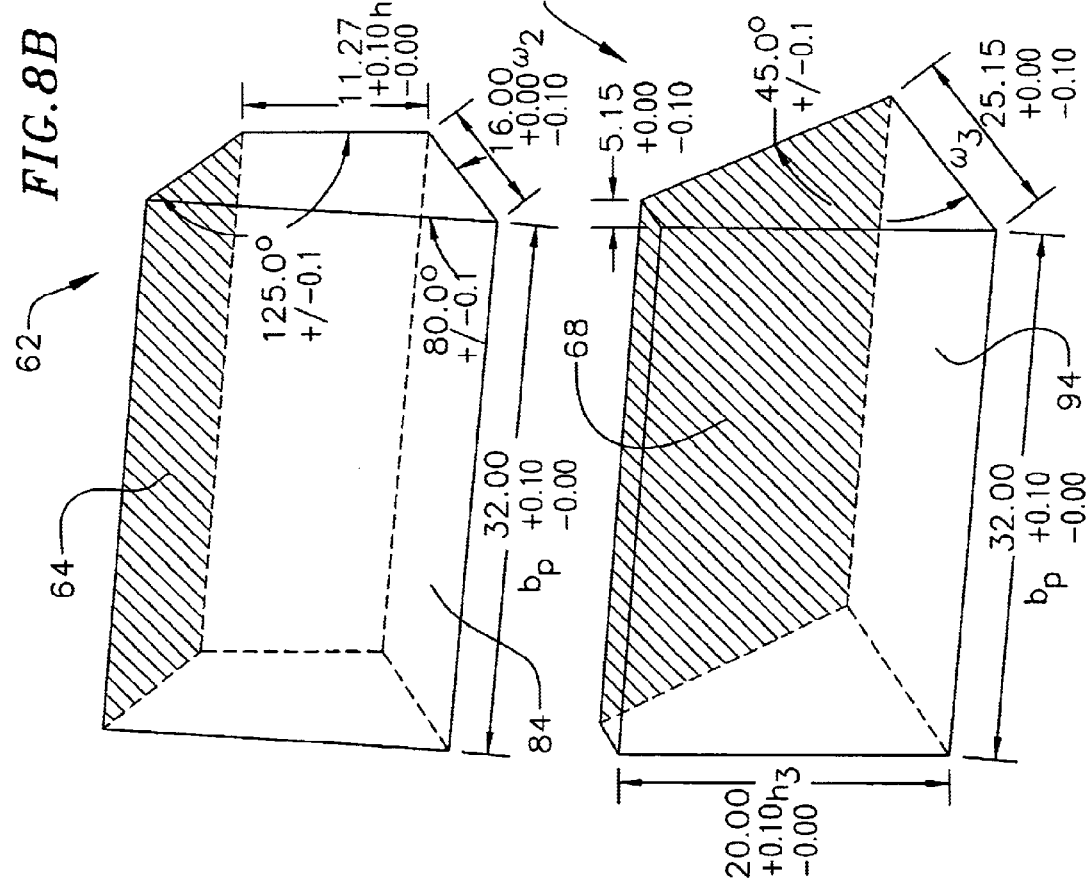
FIG. 8B

SPATIALLY MODULATED INTERFEROMETER AND BEAM SHEARING DEVICE THEREFOR

CROSS-REFERENCE TO RELATED APPLICATION

This application is based on provisional patent application Serial No. 60/129,383 filed Mar. 13, 1999.

STATEMENT REGARDING FEDERALLY SPONSORED RESEARCH OR DEVELOPMENT

The U.S. Government has certain rights in this invention pursuant to NAS7-1407 awarded by NASA.

BACKGROUND OF INVENTION

The present invention relates generally to beam shearing systems and their applications, particularly in spatially modulated or static interferometers, which have low volume, low mass, high spectra: resolution, a single instrument line shape function and are field widened.

Interferometers are a class of instruments that convert light from a source into an interference fringe pattern or interferogram. Interferometers make measurements on light within a certain portion of the spectrum. This portion is referred to as the predetermined spectral passband of the interferometer. Frequencies of light outside of the predetermined spectral passband are attenuated so that they do not cause inaccuracies in measurements made by the interferometer.

Spatially modulated or static interferometers use a beam shearing system to shear the input beam into two separate beams and a Fourier optical system can be used to recombine the two sheared beams at a detector array or photographic plate. This procedure generates an optical path difference across the wavefronts of the recombined beams, which results in the formation of a modulation pattern that is fixed in space. If a two dimensional detector array is used, then it can record the spatially modulated pattern as an interferogram in one dimension of the detector array and an image in the orthogonal direction.

Static interferometers are distinguished from other types of interferometers in that they do not require the movement of an optical component or the observational platform to generate an interferogram. Interferometers that require the movement of the observing platform or an optical element to generate their spectrum over a given time interval are prone to unrecoverable spectral errors.

The first reported static interferometer was a Michelson interferometer with tilted mirrors built by G. Stroke and A. Funkhouser (see G. W. Stroke et al., Physics Letters, 1965, Volume 16, Number 3, Pg. 272). Two decades later, T. Okamoto et al used a triangular Sagnac interferometer and a conventional camera lens to generate an interferogram (see T. Okamoto et al., Applied Optics, 1984, Volume 23, Number 2, Pg. 269). In all reported cases, traditional interferometer configurations and conventional Fourier Lenses have been used to generate the interferograms, and the detector arrays have operated in the ultra-violet to near infrared wavelength regimes.

The ability to operate a static interferometer at longer wavelengths than those used by existing static interferometers would offer certain advantages. For instance, operation in the thermal-infrared spectrum would enable fewer pixels to be used to sample the fringes of an interferogram because the frequency of fringes decreases with increased wavelength. Another advantage of operating in the thermal-infrared spectrum is that the surfaces of the optical components would no be required to meet the stringent surface quality and accuracy requirements of shorter wavelengths interferometers in order to prevent the generation of surface induced fringes that introduce errors by canceling the interferogram fringes. Thus, if a static interferometer were constructed that could operate in the thermal-infrared, then its optical components would be less costly and less time consuming to manufacture.

Conventional interferometer configurations, such as the Michelson and Sagnac interferometers, utilize beam shearing systems that waste at least 50% of the signal. These configurations typically require the beam of light input into the system to make two passes through a beam splitter during the shearing process. Light is therefore reflected back out the entrance through which it entered, resulting in the loss of at least one half of the light entering the static interferometer.

An alternative method that does not rely on the use of a beam splitter to generate a difference in optical path length was described by Padgett et al. U.S. Pat. No. 5,781,293. This method involves polarizing the input bean and then shearing it using birefringent crystals. Despite elimination of the beam splitter, at least 50% of the light entering this type of system is lost due to absorption by the input polariser.

A particular advantage of the Padgett et al static interferometer over other conventional interferometers is that it is field widened. Being field widened means that the slit can be increased to any reasonable width without influencing the spectral resolution. An interferometer will be field widened when it records the interferogram at a pupil plane. At a pupil plane, diffraction does not degrade spectral resolution.

A disadvantage of existing static interferometers is that their physical volume and mass increase significantly when high spectral resolution is required. This greatly increases cost in applications such as remote sensing devices mounted on satellites or space exploration vehicles.

Another disadvantage is that existing static interferometers do not have a single instrument line shape. The instrument line shape is the characteristic shape of the spectrum generated by the static interferometer when the instrument observes a particular frequency of radiation that is substantially narrower in bandwidth than the spectral resolution of the instrument. In existing static interferometers the line shape changes depending on the frequency of the radiation observed. These instruments must be calibrated for the line shape of each frequency in the instrument's bandwidth, which is a time consuming process. Data collected by these static interferometers are difficult to analyze and they are not suitable for generating high spectral resolution output in real time. It is desirable to use a static interferometer that possesses a single instrument line shape and which has near perfect spectral registration. This means that the detector array's output has a single line shape and the lines for the different frequencies are evenly spaced along the spectrum at equal wavenumber intervals. This simplifies the time required to calibrate the instrument and the time required to analyze the data recorded by the instrument.

Accordingly, it is desirable to develop a new static interferometer that is compact, makes use of the majority of incoming radiation, is field widened, can operate in the thermal-infrared region of the spectrum, has a single instrument line shape and has near perfect spectral registration.

SUMMARY OF INVENTION

In one aspect, the static interferometer of the present invention is capable of providing an instantaneous single-sided interferogram in a tangential exit pupil plane and an image in a sagiital image plane, both of which are located at the same point along the optical axis. The instrument can have an optical efficiency approaching 100 percent, has a high signal-to-noise ratio and is field widened. Because the interferogram is generated at a pupil plane by two perfectly collimated beams, the interferogram is not affected by diffraction. This characteristic enables the instrument to possess spectral radiometric purity, have a very broad spectral bandwidth and have the ability to operate within the thermal-infrared spectrum. In addition, this characteristic enables it to have a single instrument line shape and near-perfect spectral registration. Finally, the instrument is a compact and lightweight unit that is easy to align during construction and simple to calibrate.

In one particularly advantageous embodiment, the fore-optics collect light and focus it onto an entrance slit. The light passes through the entrance slit and into the beam shearing system, which splits it into two separate beams. The beam shearing system is constructed to ensure that the two beams of light emerging from it contain more than 50 percent of the collected light that is within the predetermined spectral passband of the instrument. The emerging beams are incident on a Fourier optical system, which collimates and recombines them onto the exit pupil plane. The recombined beams of light generate an interferogram on a detector line array located at a tangential exit pupil plane, enabling the intensity of the interferogram to be measured by the detector, read out by electronics and then digitized by an analogue to digital converter. The data processing system then manipulates the digital data to extract useful information concerning the spectral composition of the collected light. When fore-optics with a shifted pupil are used, measurements can be made using a single sided interferogram at the tangential exit plane. When a Fourier optical system is used that also focuses the light onto a sagiital image plane located at the same point on the optical axis as the tangential exit pupil plane, then a two-dimensional detector array can then be used to record the intensities of both the image and the interferogram.

The forgoing results are preferably achieved by static interferometers having: fore-optics for collecting light and focusing it into a beam; a spectral resolving system comprising of a beam shearing system to split :he beam of light having a photon flux within a predetermined spectral passband, an optical system for recombining the two split beams onto an exit pupil, and a detector located at the exit pupil. The beam shearing system preferably includes: an entrance slit structure having an entrance slit extending in a first direction for receiving the light collected by the fore-optics; a beam splitter aligned at an angle to the first direction so that the received beam of light is split into two separate beams; a reflective subsystem having a plurality of reflective surfaces defining separate light paths of equal optical path length for the two separate beams, the reflective surfaces arranged such that the two beams contain more than 50 percent of the photon flux that is within the predetermined spectral passband of the collected light. In this embodiment, the chief rays of the two separate beams are also substantially parallel to each other and the two light paths are of substantially equal optical path length.

In one form, the reflective surfaces are also arranged to ensure that the two beams remain substantially in phase relative to one another. In another form, a fore-optics may to have a shifted pupil design to generate single-sided interferograms at the exit pupil plane. In yet another form, the optical system has an optical axis and also recombines the beams that emerge from the beam shearing system to create a sagiital image plane located at the same point along that optical axis as the tangential exit pupil plane. In yet another form again, the interferometer contains a detector array, read out electronics and data processing system. The detector array records the intensity of the radiation incident on its pixels, the read out electronics digitizes these measurements and transfers them to the data processing system, and the data processing system manipulates the digitized measurements to obtain information about the spectrum of the incident radiation. In a still further form, the data processing system performs Fast Fourier Transforms (FFTs) on the digitized data to obtain the spectrum of the collected light. In a still further form again, the data processing system convolves the digitized data with digital filters to detect the presence or absence in the spectrum of the collected light of frequencies characteristically emitted or absorbed by particular chemicals.

DESCRIPTION OF DRAWINGS

The above and other features of the present invention may be more fully understood from the following detailed description, taken together with the accompanying drawings, wherein similar reference characters refer to similar elements throughout and in which:

FIG. 2 is an optical ray trace diagram of a static interferometer of the type illustrated in FIG. 1, illustrating the Y-Z plane;

FIG. 3 is an optical ray trace diagram of a static interferometer of the type illustrated in FIG. 1, illustrating the X-Z plane;

FIG. 8B illustrates the dimensions of the second and third prisms of the beam shearing structure of FIG. 5;

DETAILED DESCRIPTION OF THE INVENTION

Figure 1:
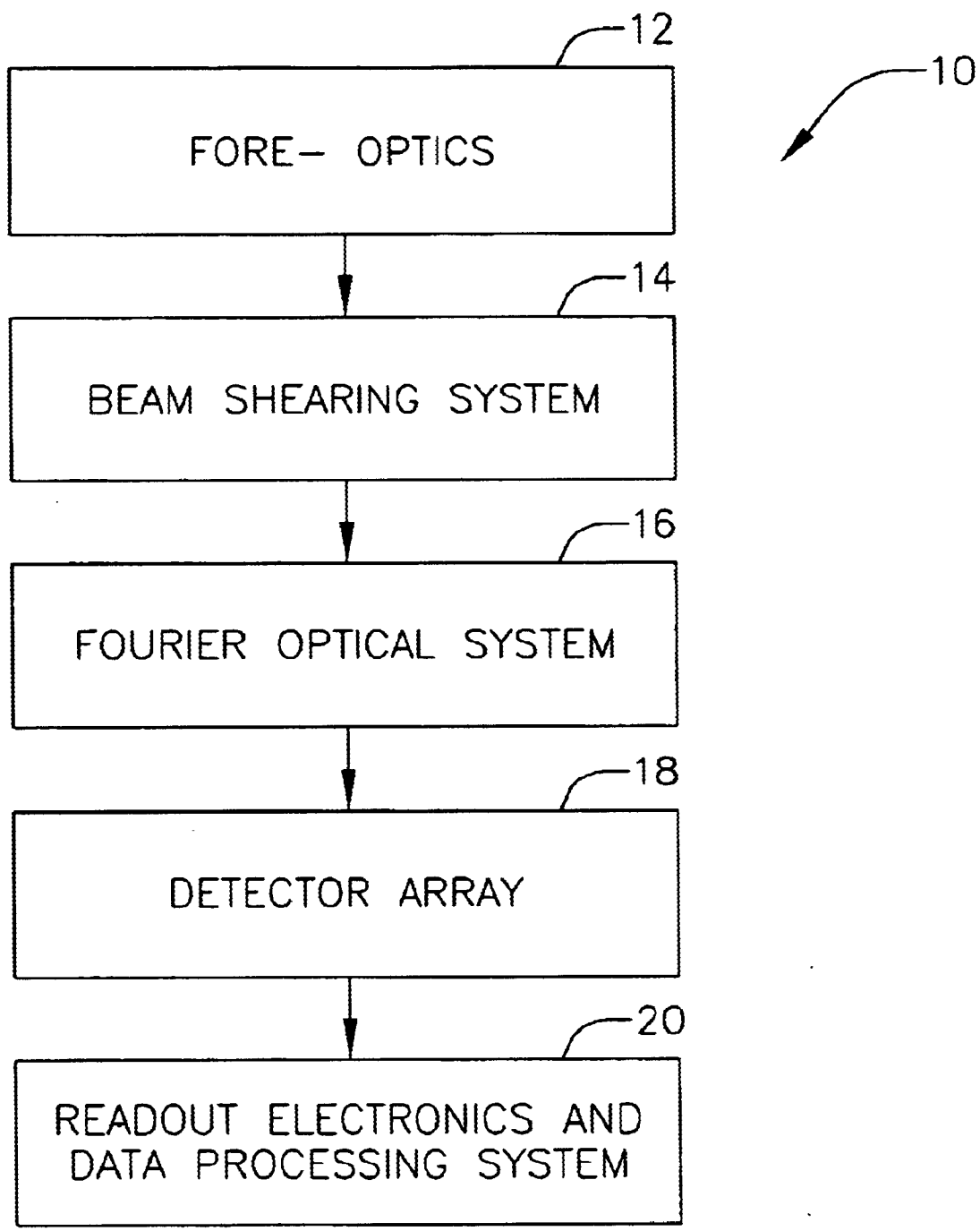
FIG. 1 is a simplified block diagram of a static interferometer constructed in accordance with one embodiment of the invention.

Referring now to the drawings, FIG. 1 illustrates a static interferometer 10 including fore-optics 12, a beam shearing system 14, a Fourier optical system 16, a detector array 18 and the read out electronics and data processing unit 20. As shown in FIGS. 2 and 3, input light 22 is focused by the fore-optics 12 into a beam 24, which passes through a slit 26 and into the beam shearing system 14. The beam shearing system 14 splits the beam into two separate beans, 30 and 32, that are widely spaced when they emerge. These beams 30,32 enter the Fourier optical system 16, which recombines them to create a pupil plane 34 and an image plane 36. The detector array 18 is located at the pupil plane 34 and at the image plane 36. The detector array 18 measures the intensity of the light incident on different areas within the pupil plane 34 and the image plane 36. These intensity measurements are then recorded by the read out electronics and data processing unit 20, which performs additional manipulations to extract useful information from the raw measurement data.

The static interferometer 10 of FIG. 1 is preferably fabricated in the configuration shown in FIGS. 2 and 3, with telecentric fore-optics and a telecentric Fourier optical system. This configuration provides spectral radiometric purity, ensures a single instrument line shape, provides, perfect spectral registration and ensures that the interferometer is field widened.

Figure 4:
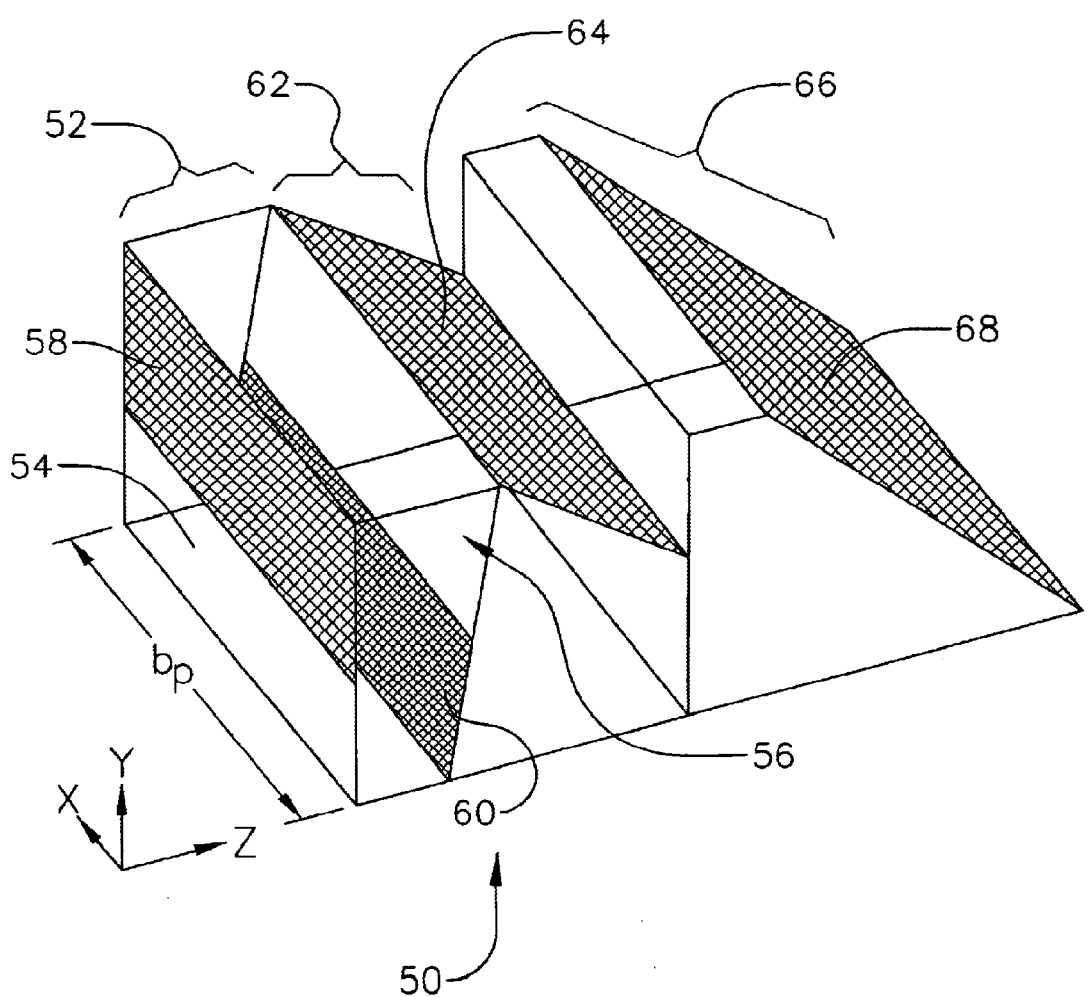
FIG. 4 is a three dimensional perspective view of a beam shearing system of the type illustrated in FIG. 2.
Figure 5:
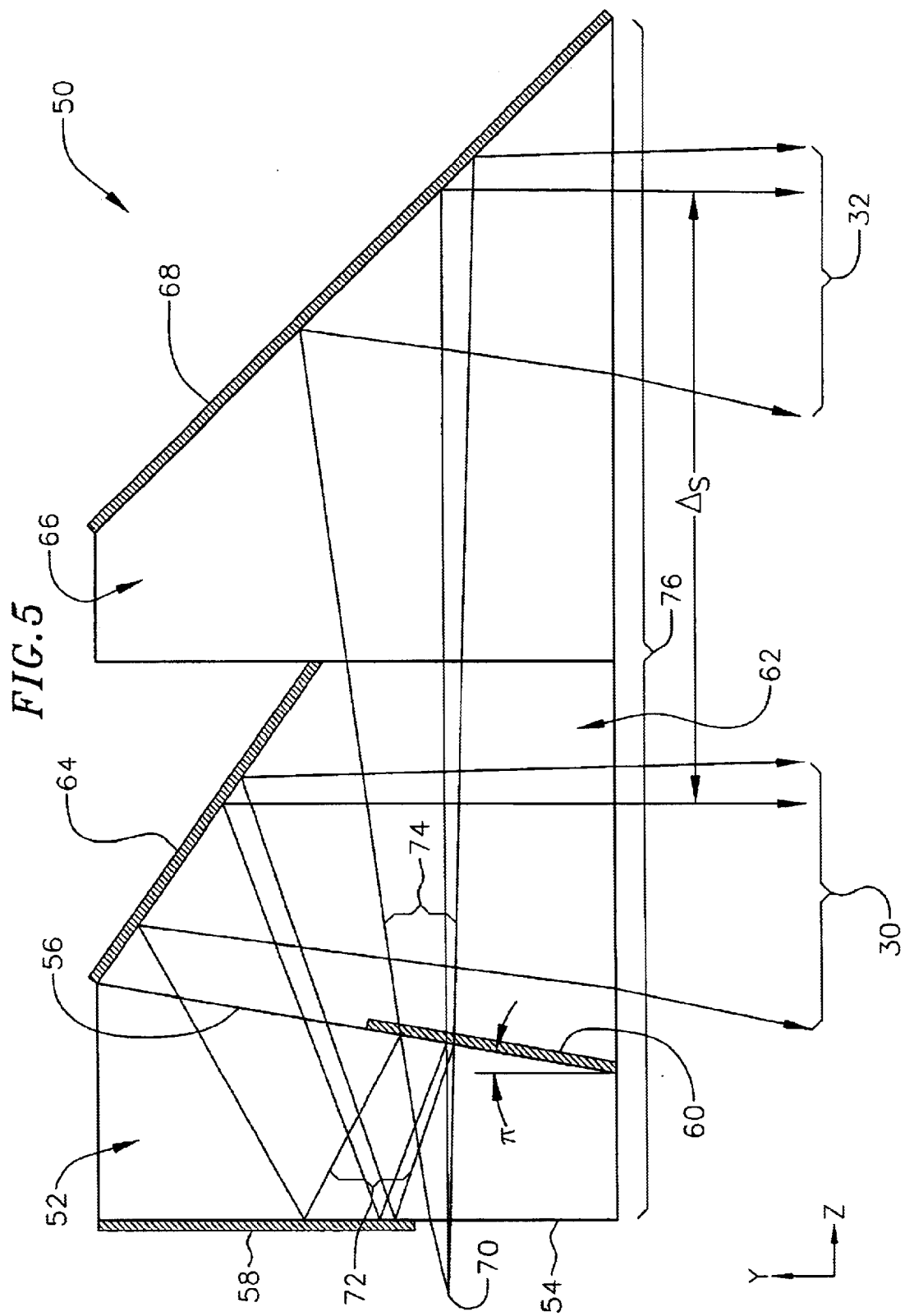
FIG. 5 is an optical ray trace diagram of a beam shearing system of the type illustrated in FIG. 2.

The performance of the static interferometer 10 is enhanced when the beam shearing system 14 takes the form of a prism structure 50 as illustrated in FIGS. 4 and 5. This configuration results in an extremely compact form of the static interferometer 10. The higher the refractive index of the material used to fabricate the prism structure 50, the more compact the prism's design. The prism structure 50 also possesses characteristics that eliminate dispersion and astigmatism, maximize the efficiency of light utilization and ensure the wavefronts of the two beams emerging from the beam shearing system 30,32 are not out of phase with respect to each other.

The prism structure 50 is typically made of KBr to avoid the need for anti-reflection coatings, but it can also be made from CsI for very broad spectral bandwidth, from Ge to avoid chromatic defocus and to increase durability, from ZnSe for high durability. Ge and ZnSe require the use of anti-reflective coatings and the performance of CsI is considerably enhanced if antireflective coatings are used. In the illustrated embodiment, all prisms in the prism structure 59 are made from the same material to ensure that both the beams emerging from the beam shearing system 30,32 travel through optical paths of identical length.

Considering the prism structure 50 of FIG. 4 in further detail, the first prism 52 consists of an entrance surface 54 and a beam splitting surface 56. A portion of the entrance surface 54 is covered in a reflective coating 58 and a portion of the beam splitter surface 54 is covered in a beam splitter coating 60. The second prism 62 and third prisms 66 each have a surface that is completely coated in a reflective coating 64 and 66. All other surfaces in the prism are optically transparent. The reflective coatings of the prism structure 50 are typically made from Al, Au or Ag and the beam splitter coating 60 is usually made from Ge.

The material chosen to construct the prism structure illustrated in FIG. 4 effects the optical efficiency of the beam splitter. The variation in optical efficiency with the choice of material is demonstrated by TABLE 1A.

TABLE 1A

| PRISM EFFICIENCIES AT 10 $\mu$m WAVELENGTH. | | | |
|---|---|---|---|
| Substrate/Coating | Ge + Al[1] | Ge + Al + Protective[2] | Ge + Au + AR[3] |
| KBr | 80% | 85% | 95% |
| CsI | 72% | 80% | 95% |
| ZnSe | — | — | 91% |
| Ge | — | — | 90% |

NOTE 1: "Ge + Al" implies a germanium beam splitter plus aluminum coatings on all reflection surfaces. No coatings are placed on transmission surfaces.
NOTE 2: "Ge + Al + Protective" implies a germanium beam splitter coating, aluminum reflection coatings, and protective coatings on all transmission surfaces. The protective coatings protect the water-soluble salt crystals from moisture.

NOTE 3: "Ge+Au+Ar" implies a germanium beam splitter coating, gold reflection coatings, and anti-reflection coatings on transmission surfaces. The gold coatings require an adhesive layer. No germanium beam splitter coating is required for the germanium substrate. The AR coatings on the salt crystals are assumed to be narrow-band, and the AR coatings on the metallic substrates are assumed to be broad-band.

A closer examination of FIG. 5 demonstrates how the prism structure 50 shears the input beam 70 of FIG. 5 into two separate beams 72 and 74. The input beam 70 enters the prism through the entrance surface 54 and is incident upon the beam splitter coating 60. This splits the beam and approximately 50% of the light is reflected in a first split beam 72 and the remainder of the light is transmitted in a second split beam 74. It is advantageous for the prism structure to be manufactured with the beam splitting surface 56 having a minimal tilt relative to the entrance surface 54, shown as π on FIG. 5. This improves the efficiency of the beam splitting coating 60, reduces polarization and prevents the first split beam 72 from being totally internally reflected at the air gap between the beam splitter surface 56 and the second prism 62 by the beam reflected off the reflective coating on the entrance surface 58.

The first split beam 72 is reflected by the reflective coating on the entrance surface 58 and is then reflected again by the second prism's reflective surface 64. The first split beam 72 then exits the prism structure 50 through the exit surface 76. The second split beam 74 continues until it strikes the third prism's reflective surface 68, where it is reflected and exits the prism structure 50 through the exit surface 76. The surfaces of the prism structure are arranged so that the first split beam of light 72 and the second split beam of light 74 have traveled the same optical distance and are parallel when they exit the exit surface 76. Overall, the prism structure 50 is extremely efficient in its utilization of light. The only way that light entering the system through the entrance surface 54 can exit the prism structure 50 is through the exit surface 76.

The prism structure 50 reflects the first split beam 72 three times and the second split beam 74 only once ensure that the wavefronts of the two beams do not undergo a 180° phase change with respect to each other. If the two wavefronts are in-phase, then the image is preserved across the entrance slit 26, single sided interferograms can be generated without loss of signal, and the optical aberrations generated by the Fourier optical system 14 tend to cancel out when the two beams 30,32 recombine at the detector array 18.

The shape of the prism structure 50, as shown in FIG. 4, affords easy mounting and alignment. Proper alignment of the prisms is important because it ensures that the modulation efficiency of the interferometer is maximized. The modulation efficiency is a measure of the fringe visibility or contrast and directly affects the signal amplitude. When the chief rays emerging from the prism are not parallel to each other or the optical system is not telecentric, then the modulation efficiency, $\eta(\beta)$, decreases as a function of the angle, $\beta$, between the two chief rays.

Therefore, a special mounting system (not shown) manufactured from aluminum is used that hard mounts the prisms 52,62,66 without the need for epoxies. The prisms are held in aluminum caps that are held in place by springs. The springs hold the prisms in alignment when the spectrometer temperature is reduced. The air gaps between the prisms are not sealed with adhesives because this introduces strong absorption features in the thermal infrared region of the spectrum.

A closer examination of FIGS. 5 through 11 reveals how the prism structure 50 is manufactured to ensure that it possesses the properties necessary for it to function effectively as the beam shearing system 14 in the static interferometer 10. Three requirements apply to the construction of all of the three prisms 52,62,66. The first is that the prism structure is constructed so that the entrance surface 54 is substantially perpendicular to the chief ray of the input beam 78 and the exit surface 76 is substantially perpendicular to both chief rays of the exit beams 30 and 32. The purpose of constructing the prism structure 50 in this way is to eliminate dispersion and astigmatism. Dispersion alters the instrument line shape as a function of wavenumber and astigmatism creates different wavefront errors in each of the two exit beams 30 and 32, broadening the instrument line shape. The following equation and explanation illustrates the effect of astigmatism on the instrument line shape. Let $\Delta\epsilon$ represent the difference in wavefront errors between the two beams at the exit pupil. Wavefront errors are caused by optical aberrations. If the optical aberrations or wavefront errors of the two beams are identical and vary slowly across the wavefront, then there is no influence on the spectral resolution or instrument line shape. Astigmatism would cause a difference in wavefront errors between the two beams. For a given $\Delta\epsilon$, the width of the instrument line shape at half maximum, $\Delta V_{1/2}$, will increase according to the following equation:

$$\Delta v_{1/2} = \frac{0.605}{\delta_{max}} + \frac{1}{y_{max}}\sqrt{\frac{v\Delta\varepsilon}{2\cos\left(\frac{FOV_F}{2}\right)}\left\{\left[\frac{F}{\Delta S\cos\left(\frac{FOV_F}{2}\right)}\right]^2 - \frac{1}{4}\right\}}$$

where
  $\Delta S$ is shown on FIG. 5
  F is the focal length of the Fourier Lens,
  $\delta_{max}$ is the maximum optical path difference,
  $Y_{max}$ is the distance between the center of the exit pupil and the edge of the exit pupil,
and
  $FOV_F=2\arctan(\Delta S/2F)$ is the field of view of the Fourier Lens.

The second is that the breadth of each of the prisms 52,52,66, shown as $b_p$ on FIG. 4, must be large enough so that all the light entering through the length of the slit is contained within the prism. In addition to these two requirements, there are manufacturing requirements that apply to each of the prisms 52,62,66 individually. The third is that the entrance surface must be perpendicular to the exit surface to minimize optical aberrations.

Figure 6:
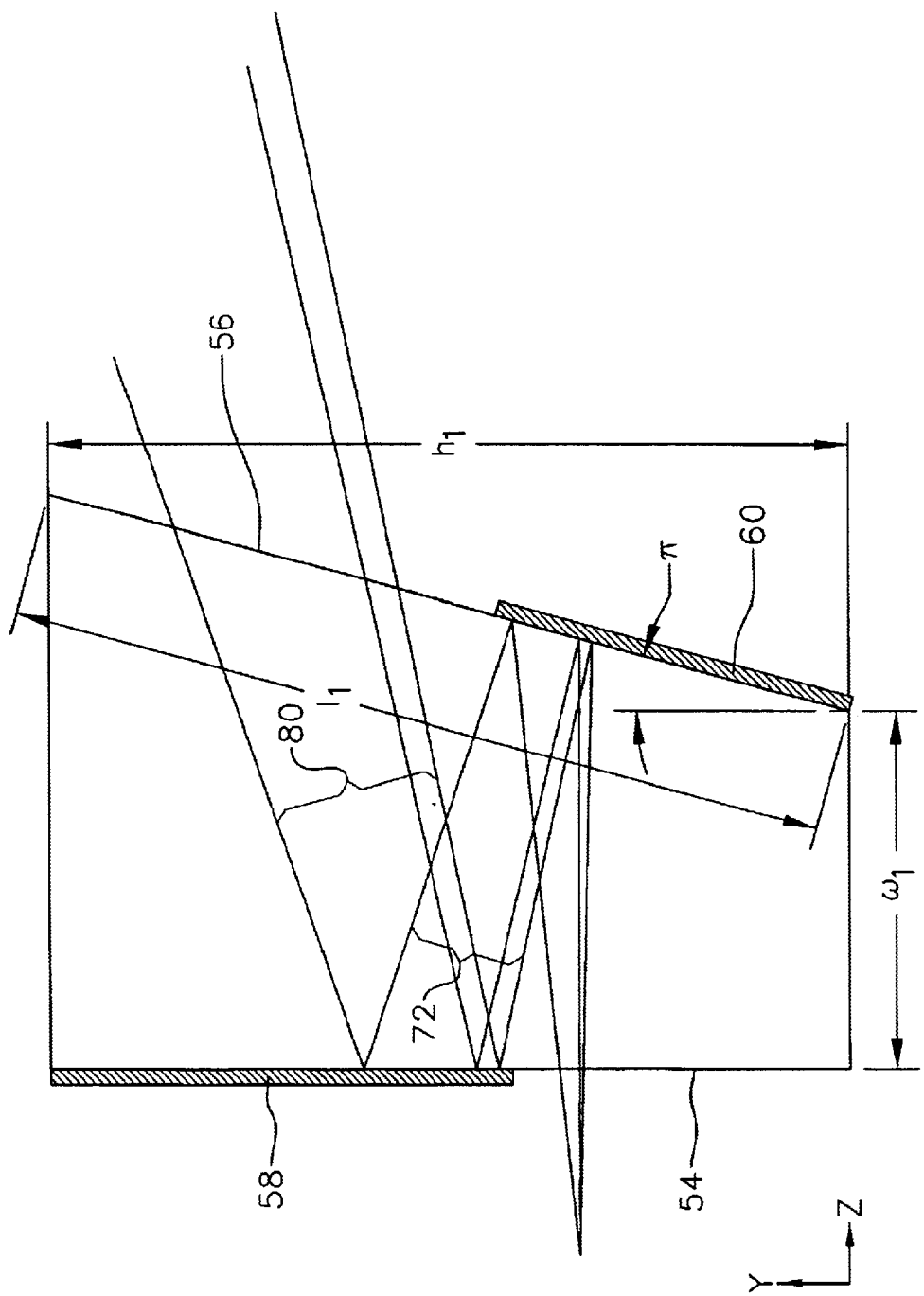
FIG. 6 is an optical ray trace diagram of the rays reflected by the beam splitting surface of a first prism of the beam shearing system of FIG. 5.

A closer examination of FIG. 6 demonstrates that the first prism 52 is manufactured so that its shape ensures the following. Firstly, the portion of the entrance surface 54 that is not coated is large enough to ensure that none of the input beam 70 is incident upon the portion of the entrance surface that is coated in reflective coating 58. Secondly, the portion of he beam splitting surface that is coated in a reflective coating 6C is wide enough to ensure that none of the input beam 70 is incident on the portion of the beam splitting surface 56 that is not coated in beam splitting coating. Thirdly, the width of the first prism $w_1$, the height of the first prism, shown as $h_1$, on FIG. 6 and the tilt angle of the beam splitting surface relative to the entrance surface, shown as $\pi$ on FIG. 6, ensure that the entire first split beam 72 is incident on the portion of the entrance surface 54 that is coated in reflective coating. Fourthly, the width of the first prism $w_1$, the height of the first prism $h_1$, the tilt angle $\pi$ and the length of the beam splitting surface 56, shown as $1_1$ on FIG. 6, ensure that the entire beam 80 reflected from the portion of the entrance surface coated in reflective coating is incident on the portion of the beam splitting surface 56 that is not coated in beam splitting coating. Finally, the width of the first prism $w_1$, the height of the first prism $h_1$, the tilt angle $\pi$ and the length of the beam splitting surface $1_1$ ensure that the length of the optical paths taken by the first splat beam 72 and the second split beam 74 throughout the entire prism structure 50 are equivalent.

Figure 7:
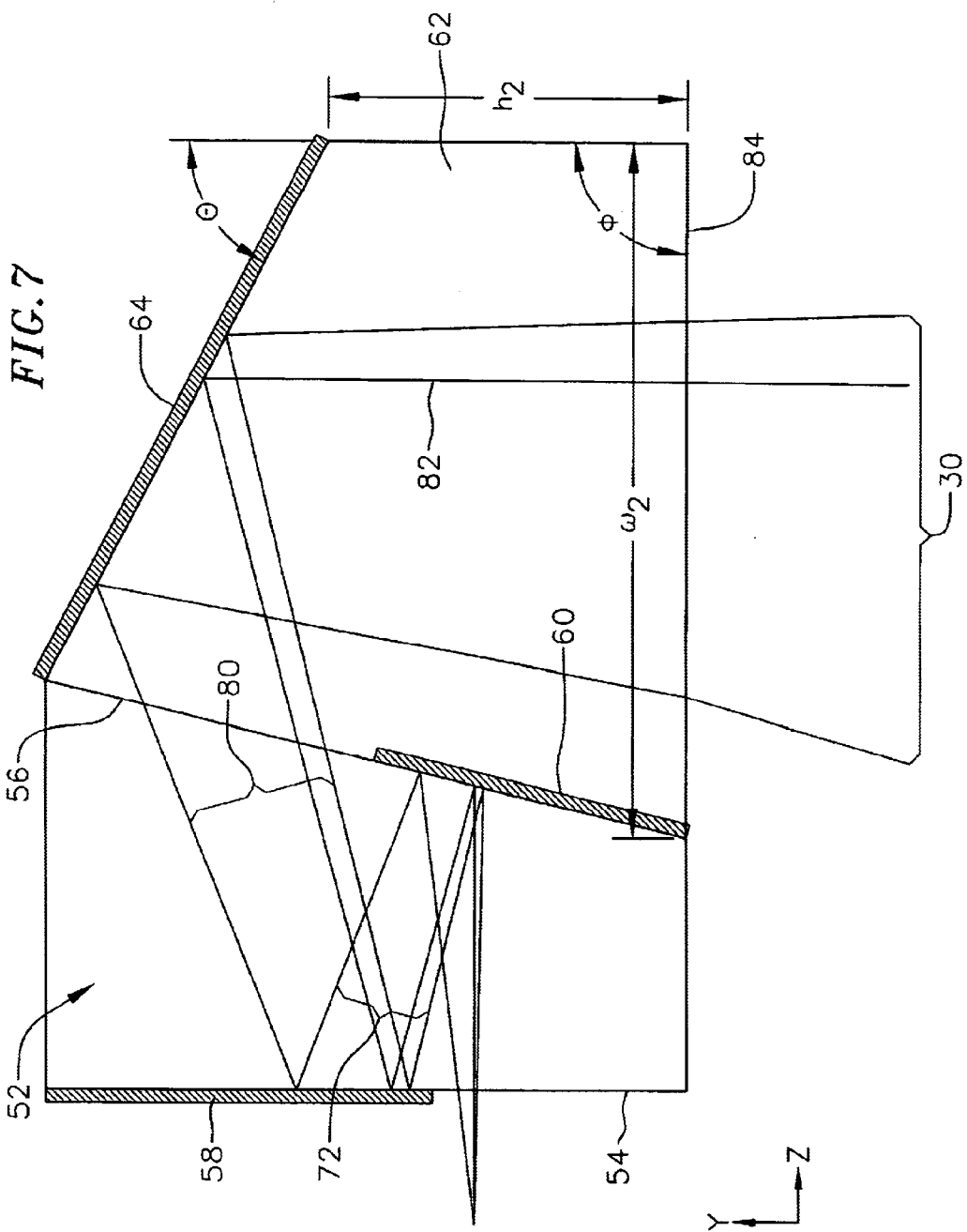
FIG. 7 is an optical ray trace diagram of the path of the first split beam in the first and second prisms of the beam shearing system of FIG. 5.
Figure 8:
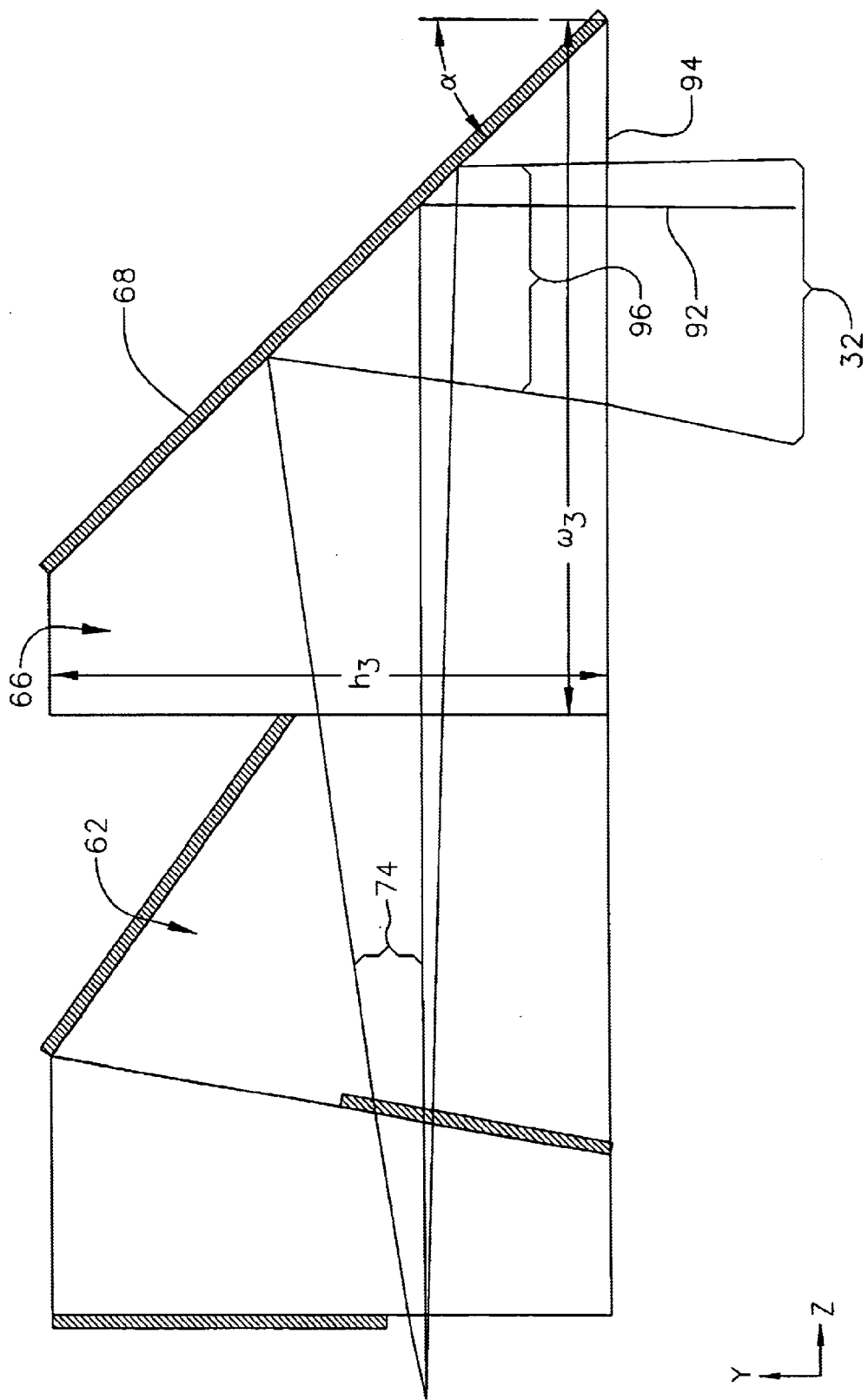
FIG. 8 is an optical ray trace diagram of the path of the second split beam in the beam shearing system of FIG. 5.

A closer examination of FIGS. 7 and 8 reveals that the second prism 62 is manufactured so that its shape ensures the following. Firstly, that the surface of the second prism adjacent to the beam splitting surface of the first prism 56 is matched to that surface. Secondly, that the width of the second prism, shown as $w_2$ on FIG. 7 and the angle of the second prism's reflective surface 64 relative to the entrance surface 54, shown as $\theta$ on FIG. 7 ensure that the entire beam 80 reflected from the portion of the entrance surface coated in reflective coating is incident upon the second prism's reflective surface 64 and that the chief ray of the beam of light reflected from this surface 82 is perpendicular to the second prism's exit surface 84. Thirdly, the width of the second prism $w_2$, the angle of the second prism's reflective surface relative to the entrance surface $\theta$ and the height of the surface of the second prism that is adjacent to the third prism 86, shown as h₂ on FIG. 7, ensure that the entire beam reflected from the second prism's reflective surface 88 emerges from the exit surface of the second prism 84 and that none of second split beam 74 is incident on the second prism's reflective surface 64. Fourthly, the angle between the surface of the second prism adjacent to the third prism 86 and the second prism's exit surface 84, shown as φ in FIG. 7, is as close to 90° as possible to prevent any total internal reflection that may result due to the tiny air gap between he two prisms. Finally, the width of the second prism $w_2$, the angle of the second prism's reflective surface relative to the entrance surface θ and the height of the surface of the second prism adjacent to the third prism $h_2$ ensure that the length of the optical paths taken by the first split beam 72 and the second split beam 74 throughout the entire prism structure 50 are equivalent.

Figure 8A:
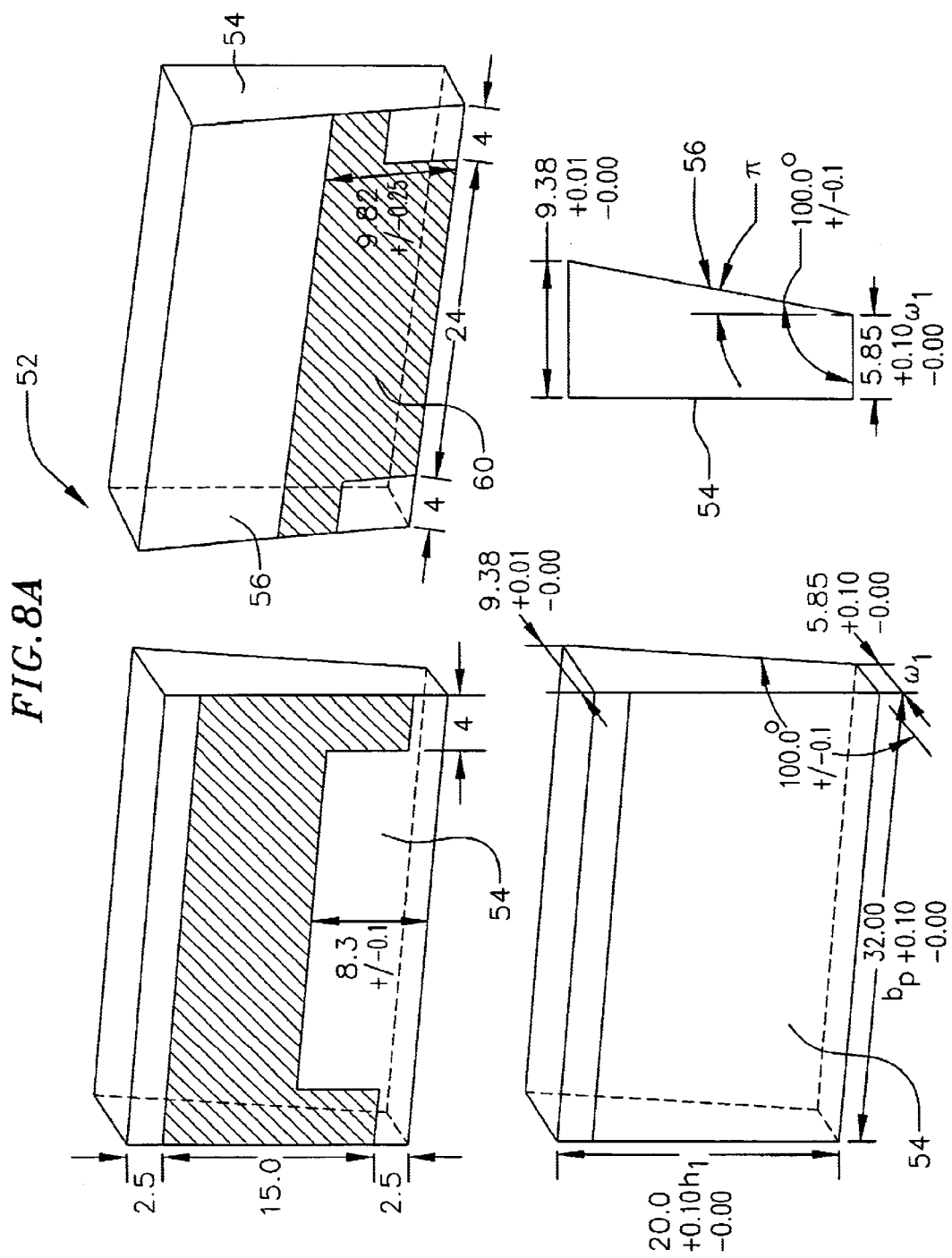
FIG. 8A illustrates the dimensions of the first prism of the beam shearing system of FIG. 5.
Figure 9:
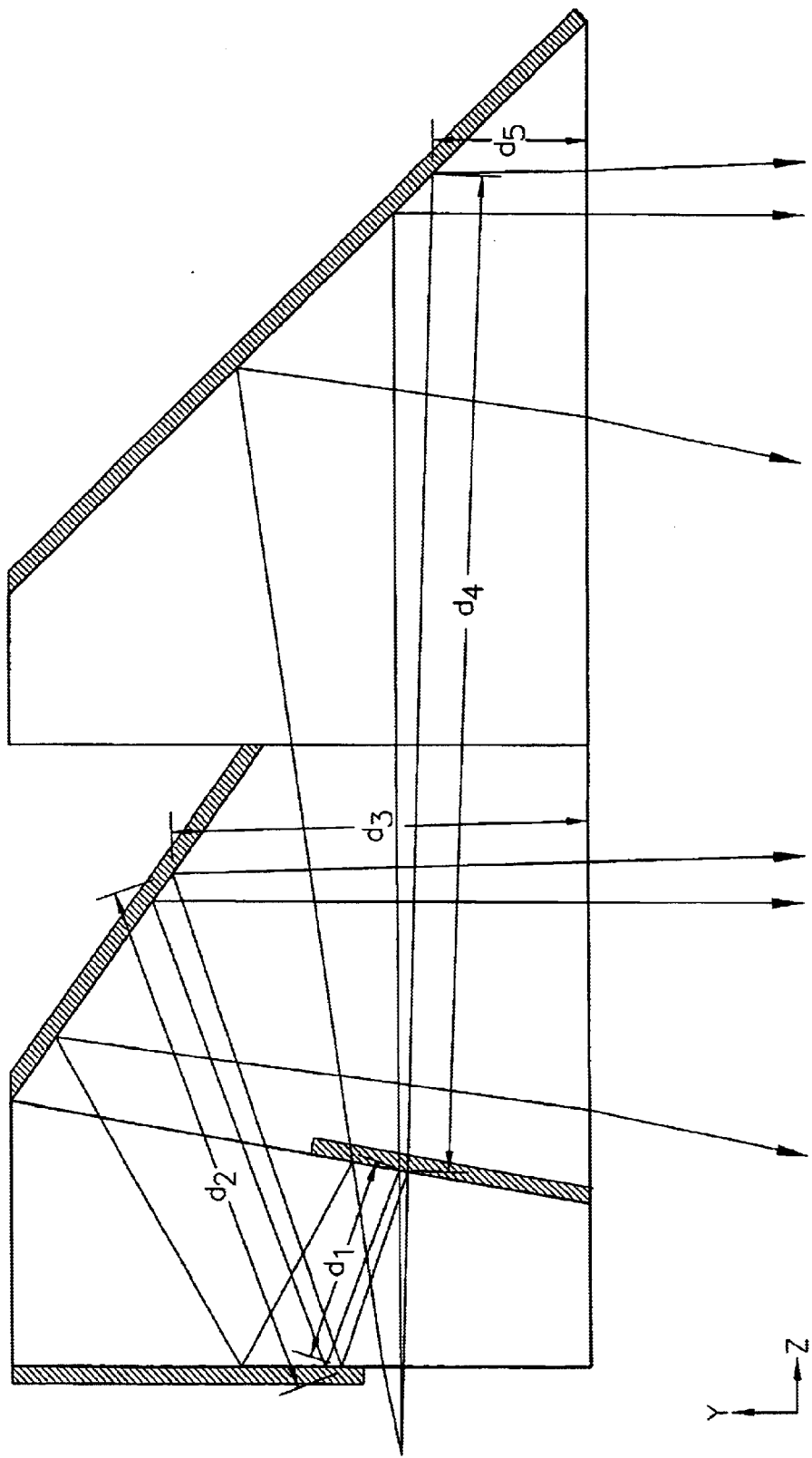
FIG. 9 is an optical ray trace diagram illustrating the path lengths of the two beams sheared by the beam shearing structure o the type illustrated in FIG. 2.
Figure 10:
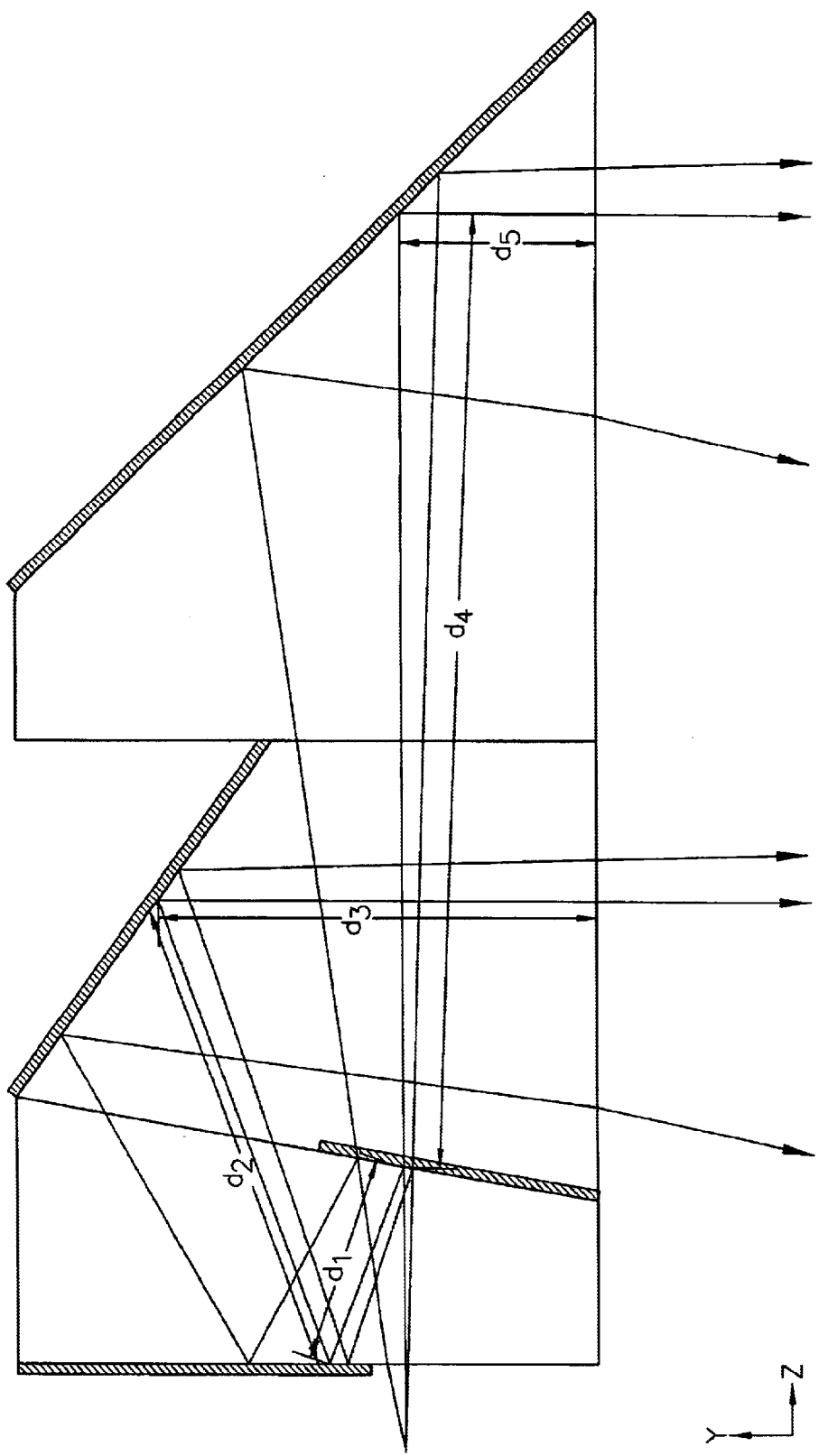
FIG. 10 is an optical ray trace diagram illustrating the path lengths of the chief rays of the two beams sheared by the beam shearing structure of the type illustrated in FIG. 2.

A closer examination of FIG. 8 reveals that the third prism 66 is manufactured so that its shape ensures the following. Firstly, the surfaces of prisms two 62 and three 66 that are adjacent to each other 86 and 90 are matched to eliminate dispersion and aberration. Secondly, that its height, shown as $h_3$ on FIG. 8, its width, shown as $W_3$ on FIG. 8 and the angle of its reflective surface 68 relative to the entrance surface 54, shown as a on FIG. 8, ensure that the chief ray of the beam of light reflected from the third prism's reflective surface 92 is perpendicular to the third prism's exit surface 94 and hat the entire beam of light reflected from the third prism's reflective surface 96 exits the third prism through the third prism's exit surface 94. Finally, that the third prism's height $h_3$, width $W_3$ and the angle of its reflective surface relative to the entrance surface a ensure that the length of the optical paths taken by the first split beam 72 and the second split beam 74 throughout the entire prism structure 50 are equivalent. FIGS. 8A and 8B show the dimensions of a prism structure 50 manufactured to receive an F/4 input beam from a slit with a length of 12.8 mm. FIG. 8A shows the dimensions of prism one 52 and FIG. 8B shows the dimensions of prisms two and three 62,68. An optical prescription for these prisms is contained in TABLES 1B–1D for an optical system presented In TABLE 2. The description of the tables is presented in the form utilized by the optical design program marketed under the tradename ZEMAX.

TABLE 1C-continued

Prism A Vertex Parameters

Repeated Vertices

| Front | R 12340 | Back | R 56780 |
|---|---|---|---|
| Top | R 26730 | Bottom | R 15840 |
| Left side | R 12650 | Right side | R 43780 |

TABLE 1D

Prism B Vertex Parameters

| | Front Face Vertices | | | | Back Face Vertices | | |
|---|---|---|---|---|---|---|---|
| V1 | −16 | −10 | 0 | V5 | −16 | −10 | 16 |
| V2 | −16 | 10.00357 | 3.53 | V6 | −16 | 1.27 | 16 |
| V3 | 16 | 10.00357 | 3.53 | V7 | 16 | 1.27 | 16 |
| V4 | 16 | −10 | 0 | V8 | 16 | −10 | 16 |

Repeated Vertices

| Front | R 12340 | Back | R 56780 |
|---|---|---|---|
| Top | R 26730 | Bottom | R 15840 |
| Left side | R 12650 | Right side | R 43780 |

TABLE 1E

Prism C Vertex Parameters

| | Front Face Vertices | | | | Back Face Vertices | | |
|---|---|---|---|---|---|---|---|
| V1 | −16 | −10 | 0 | V5 | −16 | −10 | 25.15 |
| V2 | −16 | 10 | 0 | V6 | −16 | 10 | 5.15 |
| V3 | 16 | 10 | 0 | V7 | 16 | 10 | 5.15 |
| V4 | 16 | −10 | 0 | V8 | 16 | −10 | 25.15 |

Repeated Vertices

| Front | R 12340 | Back | R 56780 |
|---|---|---|---|
| Top | R 26730 | Bottom | R 15840 |
| Left side | R 12650 | Right side | R 43780 |

A requirement in the manufacture of all the prisms, is that they must ensure the length of the optical paths taken by the first split beam 72 and the second split beam 74 through the

TABLE 1B

Non-Sequential Components Parameters

| Obj Type | Obj Name | Y Position | Z Position | Tilt X | Material | X ½ Width | Y ½ Width |
|---|---|---|---|---|---|---|---|
| Poly Obj | Prism A | | | | KBr | Scale 1 | Is Vol 1 |
| Poly Obj | Prism B | | 5.851 | | KBr | Scale 1 | Is Vol 1 |
| Poly Obj | Prism C | | 21.851 | | KBr | Scale 1 | Is Vol 1 |
| Rectangle | A1 Mirror | 4.15 | −0.01 | 10 | Mirror | 16 | 5.85 |
| Rectangle | A2 BmSp | −5.40 | 6.65 | −45 | mirror/KBr | 16 | 4.64 |
| Rectangle | C2 Mirror | | 37.0 | | Mirror | 16 | 14 |

TABLE 1C

Prism A Vertex Parameters

| | Front Face Vertices | | | | Back Face Vertices | | |
|---|---|---|---|---|---|---|---|
| V1 | −16 | −10 | 0 | V5 | −16 | −10 | 5.85 |
| V2 | −16 | 10 | 0 | V6 | −16 | 10 | 9.38 |
| V3 | 16 | 10 | 0 | V7 | 16 | 10 | 9.38 |
| V4 | 16 | −10 | 0 | V8 | 16 | −10 | 5.85 | prism structure 50 are equivalent. This requirement means that each of the rays in the split beams of light 72,74 must travel the same distance in each of the materials present in the prism structure 50 as the corresponding ray in the other split beam of light. A closer examination of FIGS. 9, 10 and 11 demonstrates that the prism structure 50 ensures that this occurs. In each of these figures the optical distance of the ray of the first split beam of light is the sum of the three distances $d_1$, $d_2$ and $d_3$ and the optical distance traveled by the corresponding ray of the second split beam of light is the sum of the two distances $d_4$ and $d_5$. In each of FIGS. 9, 10 and 11, $d_1+d_2+d_3=d_4+d_5$. Minor variations in the width of the air gaps between prisms one and two and prisms two and three are inconsequential. The optical path length for the prism structure shown in FIGS. 8A and 8B is 47 mm and the width of the air gaps is approximately 10 microns. This difference is unimportant because it does not have a significant effect on the marginal ray angles of the two split beams 72,74, when they are incident on the Fourier optical system 16.

A variation on the embodiment of the beam shearing system 14' described above is shown in FIG. 11A, this arrangement replaces the prism structure 50 with an structure involving parallel plates acting as a beam splitter 150 and three mirrors 152, 154 and 156. The basic arrangement of 3 reflections for the first split beam 72' and one reflection for the second split beam 74' is maintained. Use of this beam shearing system 14' places a limitation on the F/# of the input beam and the possible size of the separation between the two emerging beams 30' and 32', shown as Δs on FIG. 11A because the beams diverge more rapidly in air than in a higher index material.

Figure 11:
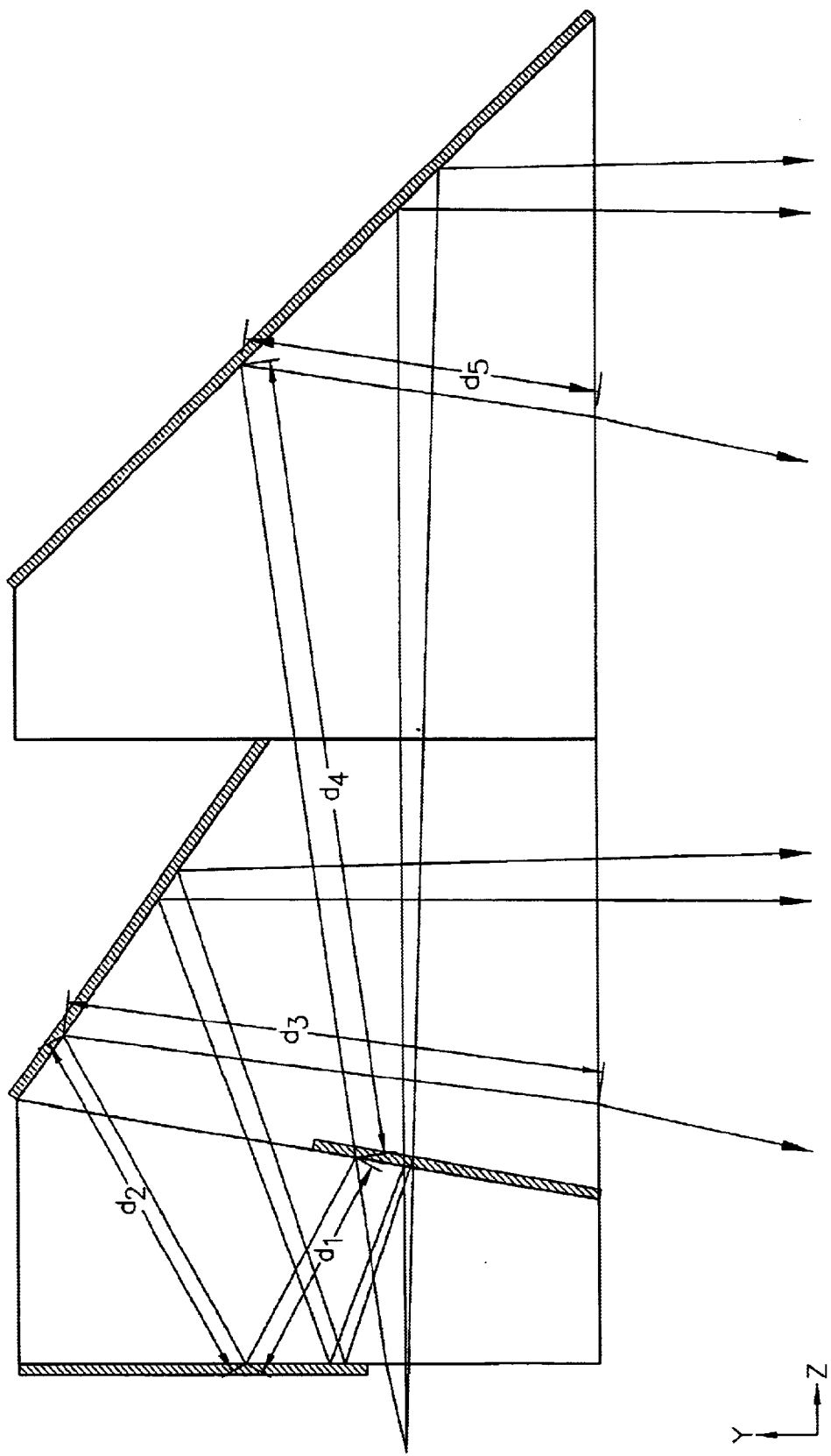
FIG. 11 is an optical ray trace diagram illustrating the path lengths of the marginal rays of the two beams sheared by the beam shearing structure of the type illustrated in FIG. 2.
Figure 11A:
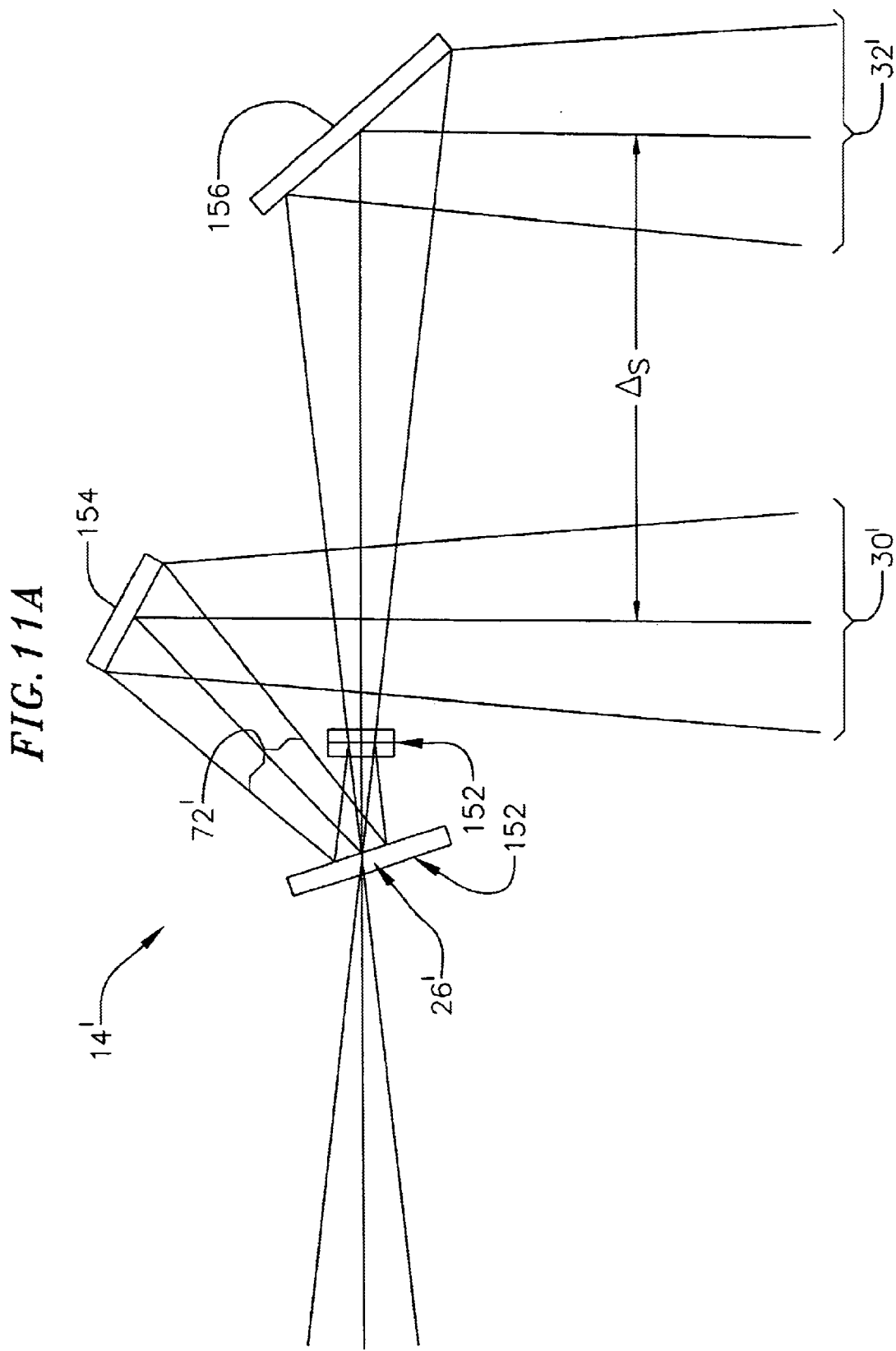
FIG. 11A is an optical ray trace diagram of an alternative embodiment of the beam shearing system illustrated in FIG. 1.

A closer examination of FIG. 11A reveals that the static interferometer must be manufactured in the following way. The entrance slit 26' must be mounted inside the first mirror 152 and the parallel plate beam splitter 150 oriented perpendicular to the chief ray of the entrance beam 158. The parallel plate beam splitter is coated on the second surface of the first parallel plate, and the second parallel plate is of equal thickness to the first plate to ensure that the total optical path length traveled by both beams is equal.

The first mirror is tilted at an angle that ensures that the first split beam 72' is reflected from the beam splitter 150 to the second mirror 154. The slit must be small compared to the returning beam 72' to minimize the amount of light lost. The second and third mirrors are aligned so that the chief rays of the two emerging beams 30' and 32' are parallel. Overall, the mirrors must be arranged to ensure that both split beams of light 72',74' travel the same optical distance.

Figure 11B:
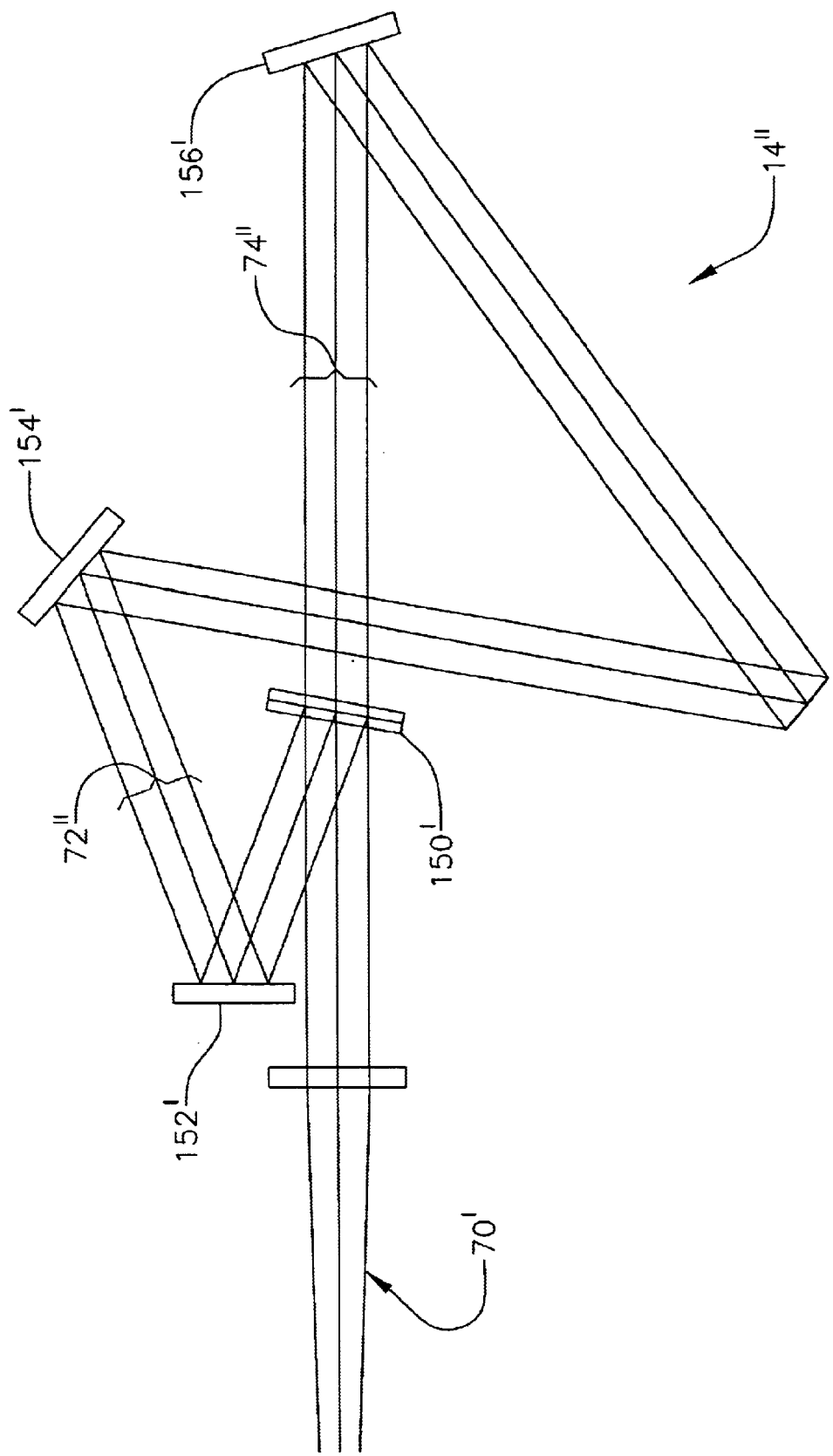
FIG. 11B is an optical ray trace diagram of a second alternative embodiment of the beam shearing system illustrated in FIG. 1.

Another variation of the beam shearing system is shown as 14" in FIG. 11B This variation is designed for use with a collimated input beam. It uses a similar parallel plate and mirror configuration as in FIG. 11A except that the beam splitter 150' is tilted with respect to the input beam 70'. The beam splitter 150' splits the input beam into two beams 72" and 74". These beams are then reflected in a similar fashion to the beam shearing system shown as 14' in FIG. 11A. However, because the beams are collimated, the beam shearing system 14" is able to recombine the two split beams at an exit pupil plane without the need for the Fourier optical system. The beam shearing system places a limitation on the F/# of the fore-optics to ensure that the exit pupil is sufficiently far from the fore-optics to enable the configuration shown.

Figure 12:
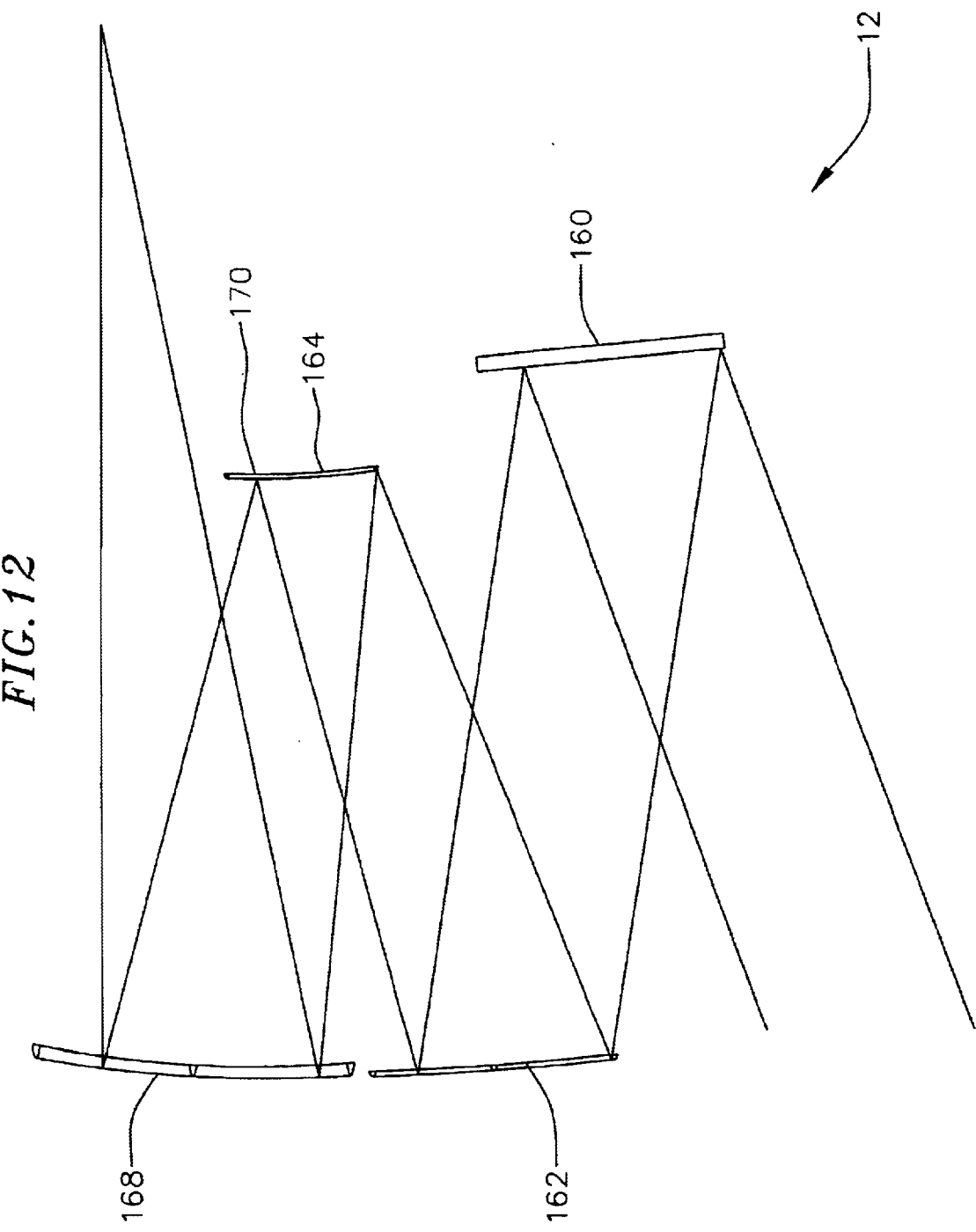
FIG. 12 is an optical ray trace diagram of fore optics of the type illustrated in FIG. 2.

The best performance of the static interferometer 10 is achieved, when the fore-optics are as shown in FIG. 12. Manufacturing the fore-optics in this way ensures that the pupil of the fore-optics is shifted to one side of the optical axis. This results in the chief ray of the input beam 22 striking the exit pupil 34 at the edge of the detector array 18, enabling a single sided interferogram to be recorded. Using a single sided interferogram instead of a complete interferogram reduces the size of the other components of the static interferometer 10 by a factor of two, without losing any information or signal.

Examining the illustration in FIG. 12 in greater detail, reveals that the fore-optics 12 comprise a scan mirror 160 and three coaxial aspheric mirrors 162, 164 and 166. The first coaxial aspheric mirror 162 is an even asphere and the other two mirrors are simple conics 164, 166. The input beam 22 is reflected by the scan mirror onto the first coaxial asphere 162, which reflects the light onto the second coaxial asphere 164. The light is finally reflected by the third coaxial asphere 166, which focuses the light onto the entrance slit 26. The focused beam 168 is telecentric and it is observed that its chief ray strikes one side of the aperture stop 170 of the second coaxial aspheric mirror because the pupil of the fore-optics is shifted. The four mirrors 160, 162, 164, 166 are co-axial, which means that the fore-optics are simple to construct.

A specific example of the mirror configuration of the fore-optics 12, illustrated in FIG. 12, is provided in part of TABLE 2. The description of TABLE 2 is presented in the form utilized by the optical design program marketed under the tradename ZEMAX. The prescription in TABLE 2 assumes that the output light 24 is F/4 in the tangential y-plane and F/5 in the sagiital X-plane.

TABLE 2

ZEMAX PRESCRIPTION: Telescope and Prism in 1.2 cm$^{-1}$ Imaging Spectrometer.

| Surface | Type | Name | Radius Mm | Thickness mm | Conic | Coeff on r4 | Coeff on r6 | Coeff on r8 |
|---|---|---|---|---|---|---|---|---|
| Object | | | Infinity | infinity | | | | |
| 1 | apert | ent port | | 130 | | | | |
| 2 | coord | tilt Y | | | | 6° | | |
| 3 | mirror | Scan | Infinity | −140 | | | | |
| 4 | coord | tilt Y | | | | 6° | | |
| 5 | mirror | TM1 asph | 631.6257 | 122.6101 | −3.2 | −8.326e-10 | 3.06657e-14 | −2.45337e-18 |
| STOP | mirror | TM2 conic | 176.0148 | −122.6101 | 0.155589 | | | |
| 7 | mirror | TM3 conic | 244.9272 | 215.1279 | 0.182058 | | | |
| 8 | coord | Decenter Y | | | | 31.2483 mm | | |
| 9 | apert | Slit | | 3 | | | | |
| 10 | coord | Decenter Y | | | | 3.2 mm | | |
| 11 | NSC | Prism | | | Reverse rays: 1 | exit location Y: −10.001 mm | exit location Z: 16.1112 mm | exit tilt X: −90° |
| 12 | standrd | Gap | | | −0.042 | | | |
| 13 | coord | Decenter Y | | | | −12 mm | | |
| 14 | coord | tilt Y | | −134.468 | | −13.383° | | |
| 15 | coord | Decenter X | | | | 13.927 mm | | |

TABLE 2-continued

ZEMAX PRESCRIPTION: Telescope and Prism in
1.2 cm$^{-1}$ Imaging Spectrometer.

| Surface | Type | Name | Radius Mm | Thickness mm | Conic | Coeff on r4 | Coeff on r6 | Coeff on r8 |
|---|---|---|---|---|---|---|---|---|
| 16 | mirror | X toroid FM1 | 136.1947 148.5778 | 113.6148 | | −9.0040886e-9 | −2.775225e-13 | |
| 17 | mirror | X toroid FM2 | −74.663 99.7735 | −77.3079 | | 5.3235734e-6 | −2.8462433e-7 | −8.10146e-10 |
| 18 | mirror | asphere FM3 | 171.811 | 77.3079 | | −9.2187783e-8 | 1.719915e-11 | −2.72977e-15 |
| 19 | mirror | Y toroid FM4 | −298.0 −209.474 | −132.6079 | | 7.7831648e-8 | −1.816862e-11 | |
| 20 | coord | tilt Y | | | 14.582° | | | |
| Image | | focal plane | infinity | | | | | |

NOTE 1:
Spectral resolution is 1.21 cm$^{-1}$. Pupil width is 50 mm, X-Field is +/− 1.888°, Y-Field is 9°, and wavelength is 13 μm. Design is valid between 5 and 20 μm with KBr or 5 and 50 μm with CsI. Tangential width of stop is 30.6 mm; sagittal width is 24.6 mm. Stop is shifted along tangential plane away from slit so that chief ray is 6.2 mm from short side and 23.8 mm from long side of stop. Detector is 12.8 × 16 mm.
NOTE 2:
In Zemax the X toroids are generated by placing coordinate breaks of 90° and −90° before and after a standard "Y" toroid. However, many optical design packages explicitly call out Y and X toroids to omit the two coordinate breaks. Therefore the coordinate breaks for the X toroids have been omitted in the above prescription. The top number is the radius, and the bottom number is the radius of rotation.
NOTE 3:
Decenters, tilts, and NSC parameters are listed in the columns with the headings "Conic", "Coeff. on r4", "Coeff. on r6", and "Coeff. on r8".

Figure 13:
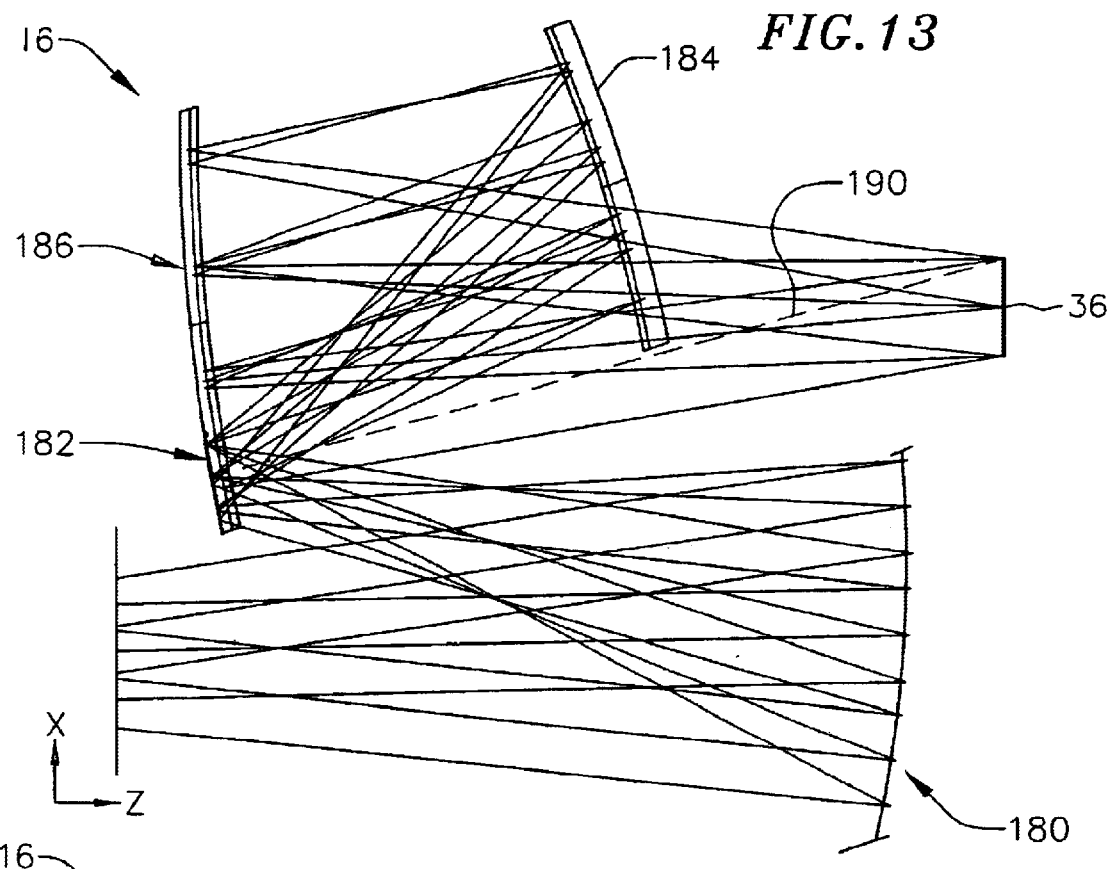
FIG. 13 is an optical ray trace diagram of a Fourier optical system of the type illustrated in FIG. 2 (view of the X-Z plane)
Figure 14:
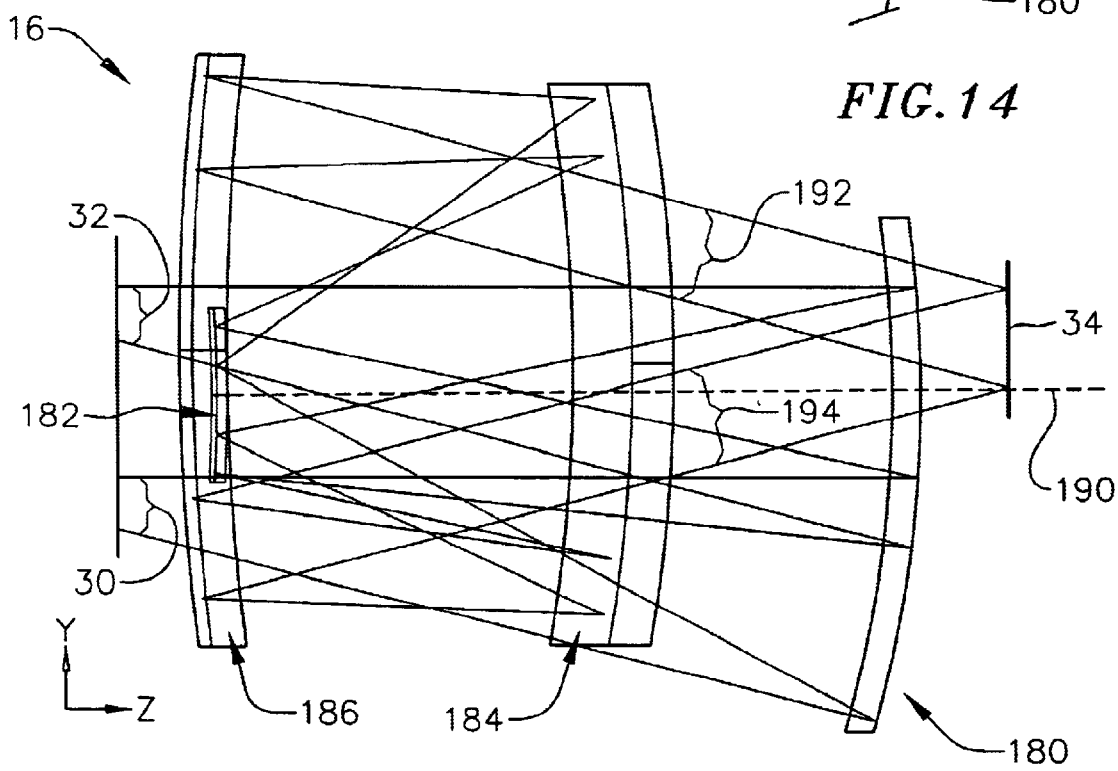
FIG. 14 is an optical ray trace diagram of a Fourier optical system of the type illustrated in FIG. 2 (view of the Y-Z plane)

The best performance of the static interferometer 10 is achieved, when the two beams emerging from the beam shearing system 30,32 are recombined using the Fourier optical system 16 shown in FIGS. 13 and 14. The Fourier optical system 16 is manufactured to maximize the image focal length and spatial resolution of the Fourier optical system by ensuring that the imaging and collimating functions are performed by the same optical components. It is also telecentric in the tangential plane to ensure spectral radiometric purity.

Examining the illustration in FIGS. 13 and 14 in greater detail, it shows a form of the Fourier optical system 6 having four mirrors and which is completely anamorphic. The first and second mirrors 180,182 are aspheric toroids that each have an aspherical surface in the X plane and a spherical surface in the Y plane. The third mirror 184 is an even asphere and the fourth mirror 186 is an aspheric toroid with an aspheric surface in the Y plane and a spherical surface in the X plane. All four mirrors are co-axial, with a vertices along the common axis 190. This property ensures that no alignment of the mirrors of the Fourier optical system is required. Their mounting (not shown) is a simple 'bolt and go' configuration.

The mirrors are manufactured to ensure that the two beams emerging from the beam shearing system 30,32 strike the first mirror 180 and are reflected onto he second mirror 182, which is located inside a cut out of the fourth mirror 186. The mirrors also ensure that the two beams are then reflected onto the third mirror 184 and from there onto the fourth mirror 186. The combination of the four mirrors ensures that the light reflected from the fourth mirror 186 forms two collimated exit beams 192 and 194 that exit the Fourier, optical system through a cut-out of the third mirror 184. The manufacture of the mirrors ensures that the two exit beams 192,194 combine and form a pupil plane 34 in the Y plane and an image plane 36 in the X plane, with both planes located at the same point along the optical axis 190.

A specific example of the mirror configuration of he Fourier optical system 16, illustrated in FIGS. 13 and 14, is also provided in TABLE 4. The description of TABLE 3 is presented in the form utilized by the optical design program marketed under the tradename ZEMAX. Manufacturing the Fourier optical system 16 according to the prescription in TABLE 4 results in it having focal length in the X and Y plane of 64 mm.

Manufacturing the fore-optics 12, the beam shearing system 14 and the Fourier optical system 16 according to the prescriptions contained in TABLES 1B–1E and 2, results in the static interferometer achieving a spectral resolution of 1.2 cm$^{-1}$ over the spectral bandpass of the material used to construct the prism structure 50. If the length of the entrance slit 26 is chosen to be 12.8 mm, then the static interferometer 10 will have a 3.8° field of view (FOV).

Figure 15:
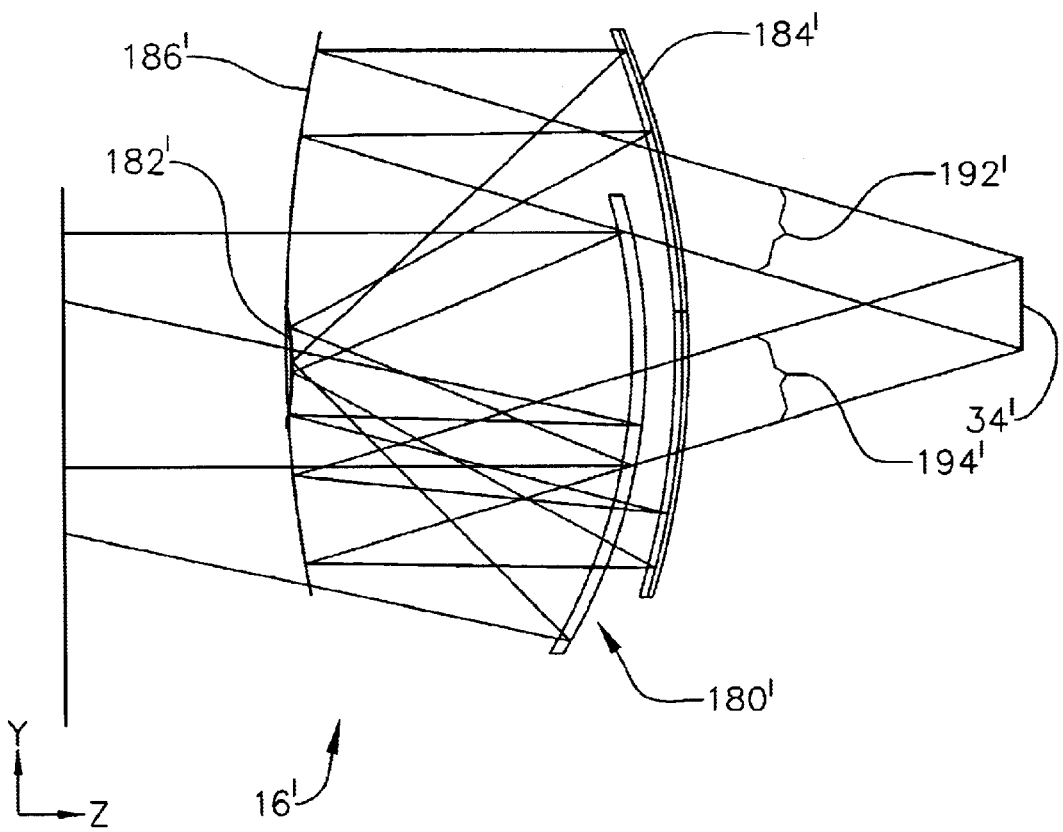
FIG. 15 is an optical ray trace diagram of a first alternative embodiment to the Fourier optical system illustrated in FIG. 1 (view of the X-Z plane)

An alternative method of manufacturing the Fourier optical system 16' to achieve a broadband, high spectral resolution, off-axis point spectrometer is shown in FIG. 15. It consists of four off-axis aspheres, 180', 182', 184' and 186', which generate two very high quality collimated beams. These beams generate a 0.5 cm$^{-1}$, single-sided interferogram across a 25 mm detector array.

Figure 16:
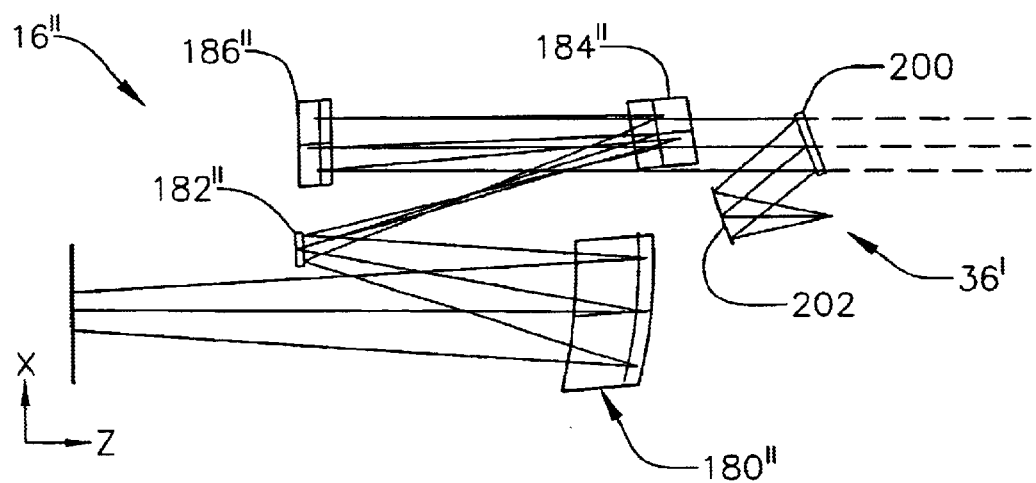
FIG. 16 is an optical ray trace diagram of a variation on the first alternative embodiment to the Fourier optical system illustrated in FIG. 1 (view of the Y-Z plane)

FIG. 16 shows a variation on this alternative method of manufacturing the Fourier optical system 16". This variation uses the same four off-axis aspheres, 180", 182", 184" and 186", but uses a fold mirror 200 and a cylindrical mirror 202 to compress the collimated beam to 1 mm in the X direction to improve the signal efficiency and reduce the width of the detector array 18. A cylindrical mirror 202 is preferable to a refractive cylindrical lens because the rays of the collimated beams passing through the thicker part of a lens would be shifted in the Y direction with respect to the rays passing through the thinner part of that lens. An optical prescription for this Fourier optical system 16" is contained in TABLE 2.

TABLE 3

ZEMAX PRESCRIPTION: 0.5 cm$^{-1}$ Point Spectrometer

| Surface | Type | Name | Radius mm | Thickness mm | Coeff on r4 | Coeff on r6 |
|---|---|---|---|---|---|---|
| Object | | | infinity | infinity | | |
| STOP | stanrd | ent pupil | | 100 | | |
| 2 | paraxial | telescope | 100 | 100 | | |
| 3 | apert | slit | | 3 | | |
| 4 | KBr | prism | | 93 | | |
| 5 | coord | tilt X | | | −45° | |
| 6 | mirror | C2 | | | | |
| 7 | coord | tilt X | | −15 | −45° | |
| 8 | standrd | prism exit | | | | |
| 9 | coord | decenter Y | | | −27.75 mm | |
| 10 | coord | tilt Y | | −138.7318 | −4.6515° | |
| 11 | coord | decenter X | | | ±13.5551 mm | |
| 12 | mirror | M1 asphere | 146.0153 | 83.9595 | 1.5855e-9 | −4.1844e-14 |
| 13 | mirror | M2 asphere | 109.167 | −95.2057 | 4.1951e-7 | −8.3999e-10 |
| 14 | mirror | M3 asphere | 235.8198 | 95.2057 | 4.1801e-8 | −1.0609e-13 |
| 15 | mirror | M4 asphere | −295 | −120.4057 | 4.3190e-8 | 2.7327e-12 |
| 16 | coord | dec X tilt Y | | | 12.1 mm | 4.6515° |
| 17 | coord | tilt Y | | | 20° | |
| 18 | mirror | fold mirror | | | | |
| 19 | coord | tilt Y | | 26.12 | 20° | |
| 20 | coord | | | | −20° | |
| 21 | mirror | X toroid | −56 | | | |
| 22 | coord | | | −26 | −20° | |
| Image | | focal plane | infinity | | | |

NOTE 1:
Spectrometer can achieve 0.5 cm$^{-1}$. Pupil width is 50 mm, X,Y-Fields are +/− 0.55° and wavelength is 13 μm. Design is valid between 5 and 20 μm with KBr or 5 and 50 μm with CsI. Tangential width of stop is 25 mm; sagittal width is 12.5 mm. Stop is shifted along tangential plane by −9.3 mm. A paraxial lens is used to simulate the telescope. Shifts in the ± X direction simulate the prism. Cylindrical mirror compresses beam without adversely affecting interferogram. Detector array is 1 × 25 mm NOTE 2:
Decenters and tilts are listed in the column with the heading "Coeff. on r4".

Figure 17:
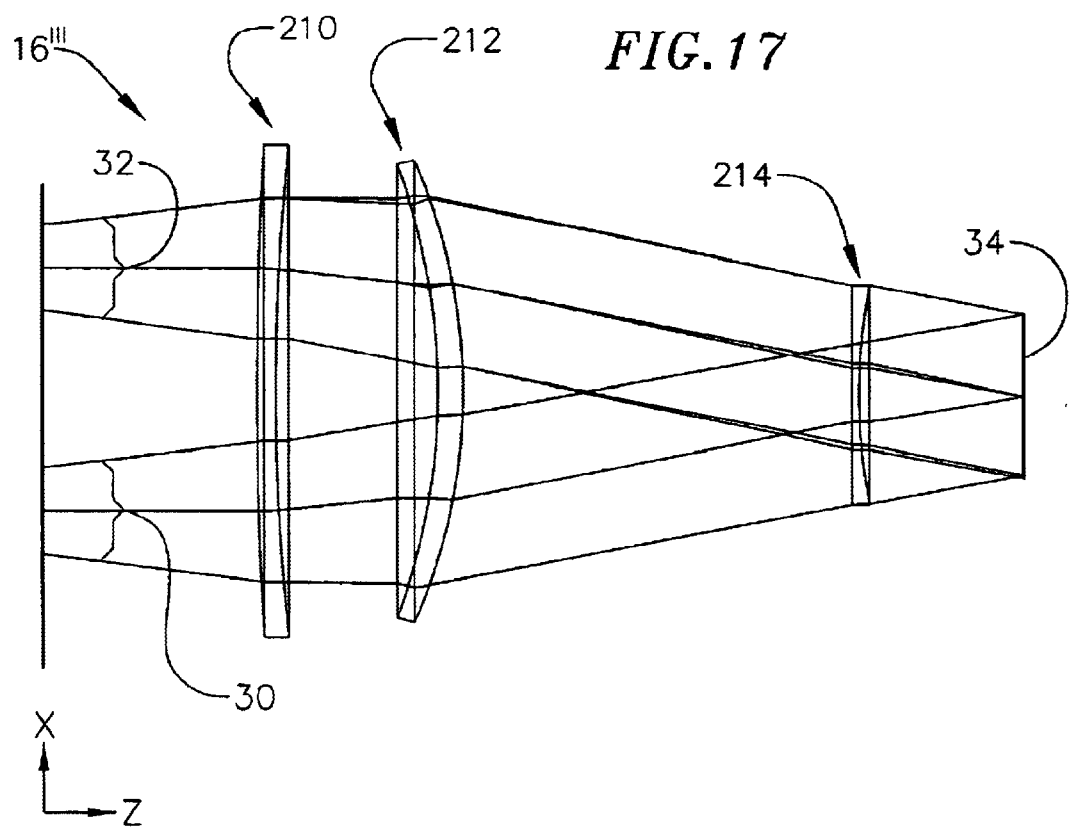
FIG. 17 is an optical ray trace diagram of a second alternative embodiment to the Fourier optical system illustrated in FIG. 1 (view of the X-Z plane)
Figure 18:
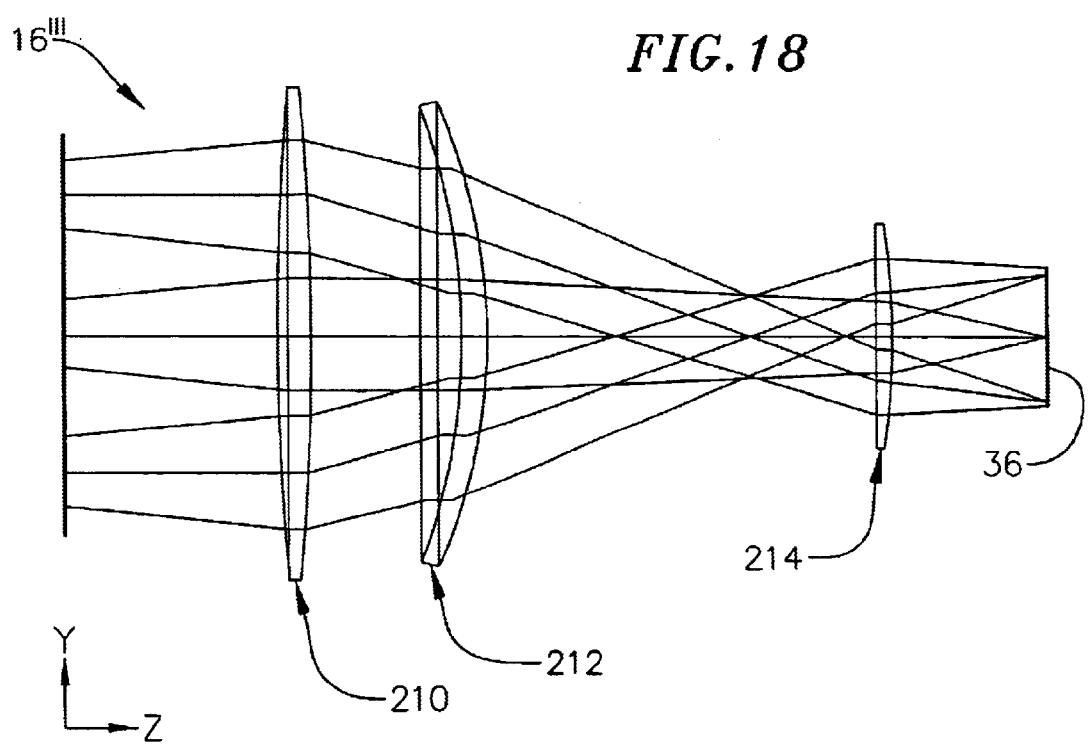
FIG. 18 is an optical ray trace diagram of a second alternative embodiment to the Fourier optical system illustrated in FIG. 1 (view of the Y-Z plane)

An alternative method of manufacturing the Fourier optical system 16''' to achieve a large FOV, on-axis refractive imaging spectrometer is shown in FIGS. 17 and 18. This configuration is appropriate where the spectral bandwidth requirements are not too broad. The imaging focal length can be made significantly shorter than the interferogram focal length of the Fourier optical system 16''' to increase the FOV. The design, shown in FIGS. 17 and 18, uses three aspheric Ge lenses 210, 212 and 214 to collimate the beams emerging from the beam shearing system 30,32 to form a pupil plane 34 in one axis and to form an image plane 36 in the other axis. An optical prescription for this Fourier optical system 16''' is contained in TABLE 4.

TABLE 4

ZEMAX PRESCRIPTION: 1.2 cm$^{-1}$ On-Axis Imaging Spectrometer

| Surface | Type | Name | Radius mm | Thickness mm | Coeff on r4 | Coeff on r6 | Coeff on r8 |
|---|---|---|---|---|---|---|---|
| Object | | | infinity | infinity | | | |
| STOP | standrd | ent pupil | | 64 | | | |
| 2 | paraxial | Telescope | 64 | 64 | | | |
| 3 | apert | Slit | | 3 | | | |
| 4 | KBr | Prism | | 40.158 | | | |
| 5 | coord | tilt X | | | −45° | | |
| 6 | mirror | C2 | | | | | |
| 7 | coord | tilt X | | −6.842 | −45° | | |
| 8 | standrd | prism exit | | 21.2106 | | | |
| 9 | Ge | L1 asphere | 292.1871 | 3 | −3.1404e-7 | −4.477e-11 | 4.1884e-13 |
| 10 | — | Y toroid | −285.5098 | 14.5723 | | | |
| 11 | Ge | L2 standard | 67.2090 | 2.35 | | | |
| 12 | — | asphere | −60.0 | 38 | −1.0316e-7 | 1.76843e-11 | −3.6181e-11 |
| 18 | Ge | L3 window | infinity | 1.5 | | | |
| 21 | | Y toroid | −63.6822 | 15 | −1.1044e-5 | 1.78802e-7 | |
| Image | | focal plane | infinity | | | | |
| Object | | | infinity | infinity | | | |
| STOP | standrd | ent pupil | | 64 | | | |
| 2 | paraxial | telescope | 64 | 64 | | | |
| 3 | apert | slit | | 3 | | | |
| 4 | KBr | prism | | 40.158 | | | |

TABLE 4-continued

ZEMAX PRESCRIPTION: 1.2 cm$^{-1}$ On-Axis Imaging Spectrometer

| Surface | Type | Name | Radius mm | Thickness mm | Coeff on r4 | Coeff on r6 | Coeff on r8 |
|---|---|---|---|---|---|---|---|
| 5 | coord | tilt X | | | 45° | | |
| 6 | mirror | C2 | | | | | |
| 7 | coord | tilt X | | −6.842 | 45° | | |
| 8 | standrd | prism exit | | 21.2106 | | | |
| 9 | Ge | L1 asphere | 292.1871 | 3 | −3.1404e-7 | −4.477e-11 | −4.1884e-13 |
| 10 | — | Y toroid | −285.5098 | 14.5723 | | | |
| 11 | Ge | L2 standard | 67.2090 | 2.35 | | | |
| 12 | — | asphere | −60.0 | 38 | −1.0316e-7 | 1.76843e-11 | −3.6181e-11 |
| 18 | Ge | L3 window | infinity | 1.5 | | | |
| 21 | | Y toroid | −63.6822 | 15 | −1.1044e-5 | 1.78802e-7 | |
| Image | | focal plane | infinity | | | | |

NOTE 1:
Pupil width is 16 mm, Y-Fields are +/−12° and wavelength is 13 μm. Design is valid between 5 and 16 μm. Width of stop in X direction is 16 mm. Width in Y direction is 12.8 mm. Stop can be shifted along tangential plane to generate single-sided interferogram and achieve 1.2 cm$^{-1}$ spectral resolution. A paraxial lens is used to simulate the telescope. Coordinate break shifts in ± X simulate the prism. Detector array is 12.8 × 16 mm.
NOTE 2:
In this design the pupil plane is in the X direction and the image plane is in the Y direction. This enabled "Y" toroids to be used to generate the image, and "Y" toroids do not require coordinate brakes to rotate them about the Z axis.
NOTE 3:
Tilts are listed in the column with the heading "Coeff. on r4".

Closer inspection of FIG. 2 illustrates that a 2 dimensional detector array is located at the pupil 34 and image 36 planes. This array makes measurements of light intensity in both the pupil and image planes. Large format AlGaAs Quantum Well Infrared Photoconductor (QWIP) arrays are the most appropriate detectors because their pixel to pixel responsivity is uniform. AlGaAs QWIP arrays can be fabricated with an operability greater than 99.99%, an uncalibrated uniformity better than 2% and a calibrated uniformity better than 0.3%. They can also be thermally cycled indefinitely, are radiation hard and remain stable after calibration.

AlGaAs QWIP detector arrays are not the only type of detector that can be used. Other examples of detector arrays that could be utilized by the static interferometer 10 include InSb, HgCdTe, microbolometers, thermopiles, CCDs and active pixel sensor (APS) arrays.

The processor unit 20 analyzes the data recorded by the detector array 18. This unit digitizes the data, stores it, can analyze it in a number of ways, including the two following methods and can output any results. The data recorded by the detector array 18 corresponds to a series of interferograms. The first possible method of analyzing this data is to perform a digital fast fourier transform (FFT) to convert each interferogram into a spectrum, which can then be further analyzed. An example would be where the spectrum s analyzed to determine the overall chemical composition of the scene being viewed.

An alternative method of analyzing the data is to use the interferograms as matched filters to detect distinct features within the interferograms. An example of this would be to detect the presence of a single chemical in the scene being viewed. This process involves using a filter shape that indicates the presence or absence of hat feature, when the filter is convolved with the interferogram. An advantage of using this second technique is that it is less computationally intensive than performing numerous FFTs. Another advantage is that the interferogram automatically separates broadband features, such as emissions from a planet's surface from narrowband features, such as are created by constituent gases in the planet's atmosphere.

Figure 19:
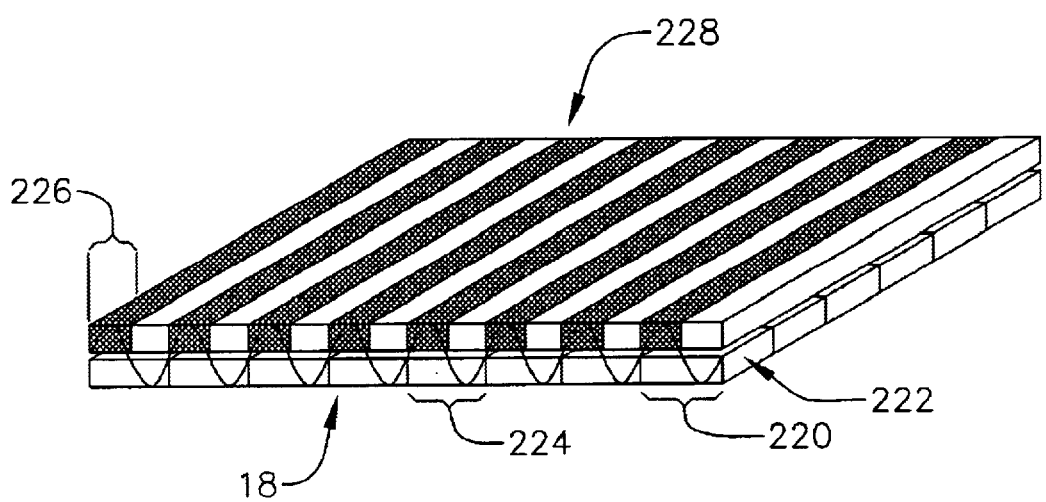
FIG. 19 is a three dimensional perspective of a detector array of the type illustrated in FIG. 1, covered by a blocking filter.

At shorter wavelengths it may be necessary to use heterodyning at the detector array. Heterodyning is appropriate if a full cycle of the interferogram 220 of FIG. 19 is located inside one pixel 222 of the detector array 18. When this occurs, the constructive 224 and destructive 226 half cycles of the interferogram will cancel each other out and the detector 18 will detect zero light intensity for that pixel 222. This phenomenon can be avoided by using a blocking filter 228. This filter discards the destructive portion of the interferogram 226, ensuring that only the constructive portion of the interferogram 224 is incident on the pixel of the detector array 222. In a broadband system, the blocking filter must be manufactured so that its pattern has a frequency that is equal to or lower than the lowest frequency in the predetermined spectral passband. The detector will then detect that light to be frequency zero and light with higher frequency will be detected as having a frequency equal to the actual frequency of the detected radiation minus the frequency of the radiation of lowest frequency. interferogram 220, using a detector 18 that would not have enough pixels to measure the intensity of the interferogram without the use of a blocking filter.

While the preferred embodiment has been described and illustrated, various substitutions and modifications may be made thereto without departing from the scope of the invention. Accordingly, it is to be understood that the present invention has been described by way of illustration and not limitation.

I claim:
1. A spectral resolving system comprising:
   an entrance slit structure having an entrance slit extending in a first direction for receiving a beam of light having a photon flux within a predetermined spectral pass band;
   a beam shearing system including:
      a beam splitter on the surface of a prism that is aligned at an angle to the first direction so that the received beam of light is split into two separate beams;
      an air gap adjacent the surface of the prism on which the beam splitter is located;
      a reflective subsystem having a plurality of reflective surfaces defining separate light paths of equal optical path length for the two separate beams, the reflective surfaces arranged such that when the two beams emerge from the beam shearing system they contain more than 50 percent of the photon flux and the chief rays of the two separate beams are substantially parallel to each other; and wherein the angle at which the beam splitter is aligned is less than the critical angle above which total internal reflection of a portion of the beam of light occurs; and an optical system configured to recombine the two separate beams of light emerging from the beam shearing system onto an exit pupil.

2. The spectral resolving system of claim 1 wherein the optical system is also configured to recombine the separate beams of light emerging from the beam shearing system to create an image substantially perpendicular to the exit pupil plane.

3. The spectral resolving system of claim 2 wherein:
the optical system has an optical axis;
the exit pupil is located in one of the group consisting of a tangential plane and a sagittal plane relative to the beam shearing system;
the image is located in the other of the group consisting of a tangential plane and a sagittal plane relative to the beam shearing system; and
the exit pupil and the image are located at substantially the same position along the optical axis.

4. The spectral resolving system of claim 1 wherein the optical system is telecentric in object space, where the object of the optical system is the entrance slit.

5. The spectral resolving system of claim 1 wherein the optical system is anamorphic.

6. The spectral resolving system of claim 1 wherein the optical system cancels aberrations when it recombines the two beams of light that emerge from the beam shearing system.

7. A static interferometer comprising:
fore-optics having a chief ray and a pupil that is asymmetric relative to the chief ray and configured to collect light and focus it into a beam;
a spectral resolving system comprising:
an entrance slit structure having an entrance slit extending in a first direction for receiving a beam of light;
a beam shearing system including:
a beam splitter aligned at an angle to the first direction configured to split the received beam of light into two separate beams;
a reflective subsystem having a plurality of reflective surfaces defining separate light paths of equal optical path length for the two separate beams, the reflective surfaces arranged such that when the two beams emerge the chiefrays of the two separate beams are substantially parallel to each other; and
an optical system configured to recombine the two separate beams of light emerging from the beam shearing system onto an exit pupil.

8. A static interferometer comprising:
fore-optics having a chief ray and a pupil that is asymmetric relative to the chief ray and configured to collect light and focus it into a beam;
a spectral resolving system comprising:
an entrance slit structure having an entrance slit extending in a first direction for receiving a beam of light;
a beam shearing system including:
a beam splitter aligned at an angle to the first direction configured to split the received beam of light into two separate beams;
a reflective subsystem having a plurality of reflective surfaces defining separate light paths of equal optical path length for the two separate beams, the reflective surfaces arranged such that when the two beams emerge the chief rays of the two separate beams are substantially parallel to each other; and
an optical system configured to recombine the two separate beams of light emerging from the beam shearing system onto an exit pupil; and
a detector located at the exit pupil.

9. The static interferometer in claim 8 wherein the detector is configured to record pixels of incident radiation intensity.

10. The static interferometer in claim 9 further comprising:
a data processing system connected to the detector; and
wherein the data processing system performs Fast Fourier Transforms on the digitized measurements to obtain the spectral composition of the incident radiation.

11. The static interferometer in claim 9 further comprising:
a data processing system connected to the detector; and
wherein the data processing system convolves the measurements with filters to detect the, presence or absence in the spectrum of the incident radiation of frequencies of radiation characteristically emitted or absorbed by particular substances.

12. The static interferometer in claim 8, wherein the two beams of light arc recombined to form a single sided interferogram at the exit pupil.

13. The static interferometer in claim 12 wherein the reflective surfaces of the reflective subsystem are configured such that when the two beams emerge from the beam shearing system they contain more than 50 percent of the photon flux of the received beam of light.

14. The static interferometer in claim 8, wherein the chief ray of light collected by the fore-optics is substantially to one side of the optical axis of the beam formed by the fore-optics.

15. The static interferometer in claim 8, wherein the fore-optics are telecentric.

16. The static interferometer of claim 8, wherein the optical system also focuses the separate beams of light emerging from the beam shearing system to create an image.

17. The static interferometer of claim 16 wherein:
the optical system has an optical axis;
the exit pupil is located in one of the group consisting of a tangential plane and a sagittal plane relative to the beam shearing system;
the image is located in the other of the group consisting of a tangential plane and a sagitial plane relative to the beam shearing system; and
the exit pupil and the image are located at substantially the same position along the optical axis.

18. The static interferometer of claim 8, wherein the fore-optics have an asymmetric pupil and are telecentric in image space.

19. A beam shearing system comprising:
an entrance slit structure having an entrance slit extending in a first direction for receiving a beam of light having a photon flux within a predetermined spectral pass band;
a beam splitter aligned at an angle to the first direction so that the received beam of light is split into two separate beams;
a reflective subsystem having a plurality of reflective surfaces defining separate light paths of equal optical path length for the two separate beams, the reflective surfaces arranged such that one of the separate beams undergoes one reflection and the other of the separate beams undergoes three reflections and that when the two beams emerge from the beam shearing system they contain more than 50 percent of the said photon flux.

20. The beam shearing system of claim 19, wherein an air gap exists between the beam splitter and one of the bodies.

21. The static interferometer of claim 20, wherein the fore-optics are constructed using a single lens, two or more lenses, a configuration of mirrors or catadioptric systems.

22. The beam shearing system in claim 19 wherein the two beams emerging from the beam shearing system contain substantially all of the light entering the system through the entrance sit.

23. The beam shearing system in claim 19 wherein the two light paths defined by the reflective subsystem cause the wave fronts of the two separate beams to remain substantially in phase relative to one another when the beams emerge from the beam shearing system.

24. The beam shearing in claim 19 wherein the plurality of reflective surfaces are further arranged so that the separate beams of light are of substantially equal intensity, when they emerge from the beam shearing system.

25. The beam shearing system in claim 19 wherein:
the reflective subsystem comprises a plurality of bodies with a beam splitter therebetween; and
the entrance and exit surfaces of the plurality of bodies arc substantially perpendicular to the chief ray of the received beam of light.

26. A static interferometer comprising:
fore-optics for collecting light and collimating into a beam, the fore-optics possessing an exit pupil;
a beam shearing system comprising:
an entrance slit structure having an entrance slit extending in a first direction for receiving a beam of light having a photon flux within a predetermined spectral pass band;
a beam shearing system comprising:
a beam splitter aligned at an angle to the first direction so that the received beam of light is split into two separate beams;
a reflective subsystem having a plurality of reflective surfaces defining separate light paths of equal optical path length for the two separate beams, the reflective surfaces arranged such that one of the separate beams undergoes one reflection and the other of the separate beams undergoes three reflections and that when the two beams emerge from the beam shearing system they contain more than 50 percent of the said photon flux; and
a detector located at said exit pupil where the two beams emerging from the beam shearing system converge.

27. The static interferometer in claim 26 wherein the detector comprises a detector array, read out electronics and a data processing system.

28. The static interferometer in claim 27 wherein:
the detector array records the intensity of the radiation incident on its pixels;
the read out electronics digitizes the intensity measurements made by the detector array and transfers them to the data processing system; and
the data processing system manipulates the digitized measurements to obtain information about the spectrum of the incident radiation.

29. The static interferometer in claim 28 wherein the data processing system performs Fast Fourier Transforms on the digitized measurements to obtain the spectral composition of the incident radiation.

30. The static interferometer in claim 29 wherein the data processing system convolves the digitized measurements with digital filters to detect the presence or absence in the spectrum of the incident radiation of frequencies of radiation characteristically emitted or absorbed by particular substances.

31. The static interferometer in claim 26 which further comprises:
an anamorphic optical'system possessing an optical axis;
the exit pupil being perpendicular to the optical axis;
the optical system focusing the two beams emerging from the beam shearing system to create an image; and
the image being perpendicular to the exit pupil and perpendicular to the optical axis.

32. A beam shearing system for shearing an incident beam of light having a chief ray, comprising:
a first prism possessing a surface acting as a beam splitter;
a second prism positioned to create an air gap between the second prism and the surface;
wherein the first and second prisms are positioned such that the incident beam of light is incident on the surface at an angle that substantially prevents total internal reflection;
wherein the incident beam of light is split by the beam splitter into two separate beams of light that emerge from the beam shearing system; and
wherein the two beams of light are substantially parallel when they emerge from the beam shearing system and contain more than 50% of the incident light.

33. A beam shearing system for shearing an incident beam of light having a chief ray, comprising:
a first prism possessing a surface acting as a beam splitter;
a second Prism positioned to create an air gap between the second prism and the surface;
wherein the first and second prisms are positioned such that the incident beam of light is incident on the surface at an angle that substantially prevents total internal reflection;
wherein the incident beam of light is split by the beam splitter into two separate beams of light that emerge from the beam shearing system; and
wherein the two beams of light are substantially parallel when they emerge from the beam shearing system and contain more than 50% of the incident light; and
wherein both the beams of light emerging from the beam shearing system include infrared radiation.

34. A beam shearing system for shearing an incident beam of light having a chief ray, comprising:
a first prism possessing a surface acting as a beam splitter;
a second prism positioned to create an air Rap between the second prism and the surface;
wherein the first and second prisms are positioned such that the incident beam of light is incident on the surface at an angle that substantially prevents total internal reflection;
wherein the incident beam of light is split by the beam splitter into two separate beams of light that emerge from the beam shearing system; and
wherein the two beams of light are substantially parallel when they emerge from the beam shearing system and contain more than 50% of the incident light; and
wherein both the beams of light emerging from the beam shearing system include ultraviolet radiation.

* * * * *